US009525473B2

(12) United States Patent
Sakoda et al.

(10) Patent No.: US 9,525,473 B2
(45) Date of Patent: Dec. 20, 2016

(54) COMMUNICATION DEVICE AND COMMUNICATION METHOD, COMPUTER PROGRAM, AND COMMUNICATION SYSTEM

(75) Inventors: Kazuyuki Sakoda, Tokyo (JP); Yuichi Morioka, Tokyo (JP); Ryo Sawai, Tokyo (JP); Hiroaki Takano, Saitama (JP); Ryota Kimura, Tokyo (JP); Takushi Kunihiro, Tokyo (JP)

(73) Assignee: SONY CORPORATION, Tokyo (JP)

( * ) Notice: Subject to any disclaimer, the term of this patent is extended or adjusted under 35 U.S.C. 154(b) by 324 days.

(21) Appl. No.: 13/258,040

(22) PCT Filed: Feb. 9, 2010

(86) PCT No.: PCT/JP2010/051896

§ 371 (c)(1), (2), (4) Date: Sep. 21, 2011

(87) PCT Pub. No.: WO2010/119718

PCT Pub. Date: Oct. 21, 2010

(65) Prior Publication Data

US 2012/0020420 A1 Jan. 26, 2012

(30) Foreign Application Priority Data

Apr. 15, 2009 (JP) ................................ 2009-099324

(51) Int. Cl.

*H04B 7/00* (2006.01)
*H04B 7/06* (2006.01)

(Continued)

(52) U.S. Cl.

CPC .............. *H04B 7/0617* (2013.01); *H01Q 3/26* (2013.01); *H01Q 9/16* (2013.01); *H01Q 13/10* (2013.01);

(Continued)

(58) Field of Classification Search

CPC .... H04B 7/0617; H04L 1/0003; H04L 1/0009; H04L 1/1607; H04L 1/1829

(Continued)

(56) References Cited

U.S. PATENT DOCUMENTS 6,167,436 A * 12/2000 Yamane et al. ............... 709/213
7,224,685 B2 5/2007 Proctor (Continued)

FOREIGN PATENT DOCUMENTS

JP 2004 072539 3/2004
JP 2005 503061 1/2005

(Continued)

OTHER PUBLICATIONS

International Search Report issued May 18, 2010 in PCT/JP10/051896 filed Feb. 9, 2010.

*Primary Examiner* — Khaled Kassim
*Assistant Examiner* — Berhanu Belete
(74) *Attorney, Agent, or Firm* — Chip Law Group

(57) ABSTRACT

Suitable beam pattern control is performed while performing access control based on physical carrier sense.

A communication device transmits frames having a long preamble under a state where signals will not reach unless a beam pattern is formed, thereby enabling access control based on physical carrier sense, and under a state where signals will sufficiently reach without a beam pattern being formed transmits frames having a shorter preamble, thereby suppressing transmission overhead. Also, a beam pattern and preamble type are decided based on transmission/reception history of access control following CSMA/CA procedures.

14 Claims, 19 Drawing Sheets

| Preamble-0 | header | PSDU |
|---|---|---|
| Preamble-1 | header | PSDU |
| Preamble-2 | header | PSDU |

(51) Int. Cl.

| | |
|---|---|
| ***H01Q 3/26*** | (2006.01) |
| ***H01Q 9/16*** | (2006.01) |
| ***H01Q 13/10*** | (2006.01) |
| ***H01Q 21/06*** | (2006.01) |
| ***H04B 7/04*** | (2006.01) |
| ***H04W 74/08*** | (2009.01) |
| *H04W 72/04* | (2009.01) |

(52) U.S. Cl.
CPC ............ *H01Q 21/06* (2013.01); *H04B 7/0408* (2013.01); *H04W 74/0808* (2013.01); *H04W 72/046* (2013.01)

(58) Field of Classification Search
USPC 370/310, 312, 329, 336, 342, 338; 455/522, 69, 127, 450
See application file for complete search history.

(56) References Cited

U.S. PATENT DOCUMENTS 8,014,416 B2* 9/2011 Ho ......................... H04B 7/061 370/431
8,437,769 B1* 5/2013 Sarkar .................. H04W 74/08 455/456.1
2002/0021684 A1* 2/2002 Toshimitsu .......... H04B 7/2615 370/337
2003/0048770 A1 3/2003 Proctor
2003/0137966 A1 7/2003 Odman et al.
2004/0109474 A1* 6/2004 Koshino ............... H04J 3/0658 370/503
2004/0137952 A1* 7/2004 Umesh ................. H04W 16/28 455/562.1
2005/0181832 A1* 8/2005 Ishii ...................... H04W 36/06 455/562.1
2005/0213556 A1* 9/2005 Wax ....................... H04B 7/086 370/349
2005/0255892 A1* 11/2005 Wong et al. ............... 455/562.1
2005/0265472 A1* 12/2005 Takeda ..................... H04B 7/04 375/267
2006/0025178 A1* 2/2006 Tao ...................... H04B 7/0617 455/562.1
2006/0154667 A1* 7/2006 Seo ....................... H04W 16/00 455/446
2007/0064738 A1* 3/2007 Takagi et al. ................. 370/473
2007/0217352 A1* 9/2007 Kwon ........................... 370/312
2007/0232235 A1* 10/2007 Li ......................... H04W 28/18 455/63.1
2007/0263734 A1* 11/2007 Seki ...................... H04L 1/0006 375/259
2008/0085681 A1* 4/2008 Wang .................. H04B 7/0408 455/72
2008/0095137 A1* 4/2008 Levy ................. H04W 74/0858 370/342
2008/0112370 A1* 5/2008 Kwon .................. H04W 28/20 370/336
2008/0153502 A1* 6/2008 Park ...................... H04W 8/005 455/446
2008/0192776 A1* 8/2008 Fleming .................. H04L 7/041 370/514
2008/0267142 A1* 10/2008 Mushkin ............. H01Q 1/2291 370/338
2008/0318606 A1* 12/2008 Tsutsui ................ H04B 7/0417 455/500
2009/0036052 A1* 2/2009 Miyanaga ............. H04B 7/022 455/18
2009/0042582 A1* 2/2009 Wang ................ H04W 74/0866 455/450
2009/0086706 A1* 4/2009 Huang et al. ................. 370/349
2009/0097533 A1* 4/2009 Lakkis ................... H04B 1/707 375/146
2009/0196203 A1* 8/2009 Taira .................... H04B 7/0617 370/280
2009/0235111 A1* 9/2009 Suzuki ................ G06F 11/1443 714/4.1
2010/0002627 A1* 1/2010 Ngo ...................... H04W 74/02 370/328
2010/0220713 A1* 9/2010 Tynderfeldt ...... H04W 56/0045 370/350
2010/0265925 A1* 10/2010 Liu ...................... H04B 7/0617 370/336

FOREIGN PATENT DOCUMENTS

| | | |
|---|---|---|
| JP | 2005 102136 | 4/2005 |
| JP | 2006 505148 | 2/2006 |
| JP | 2007 324773 | 12/2007 |
| JP | 2008 11157 | 1/2008 |

* cited by examiner

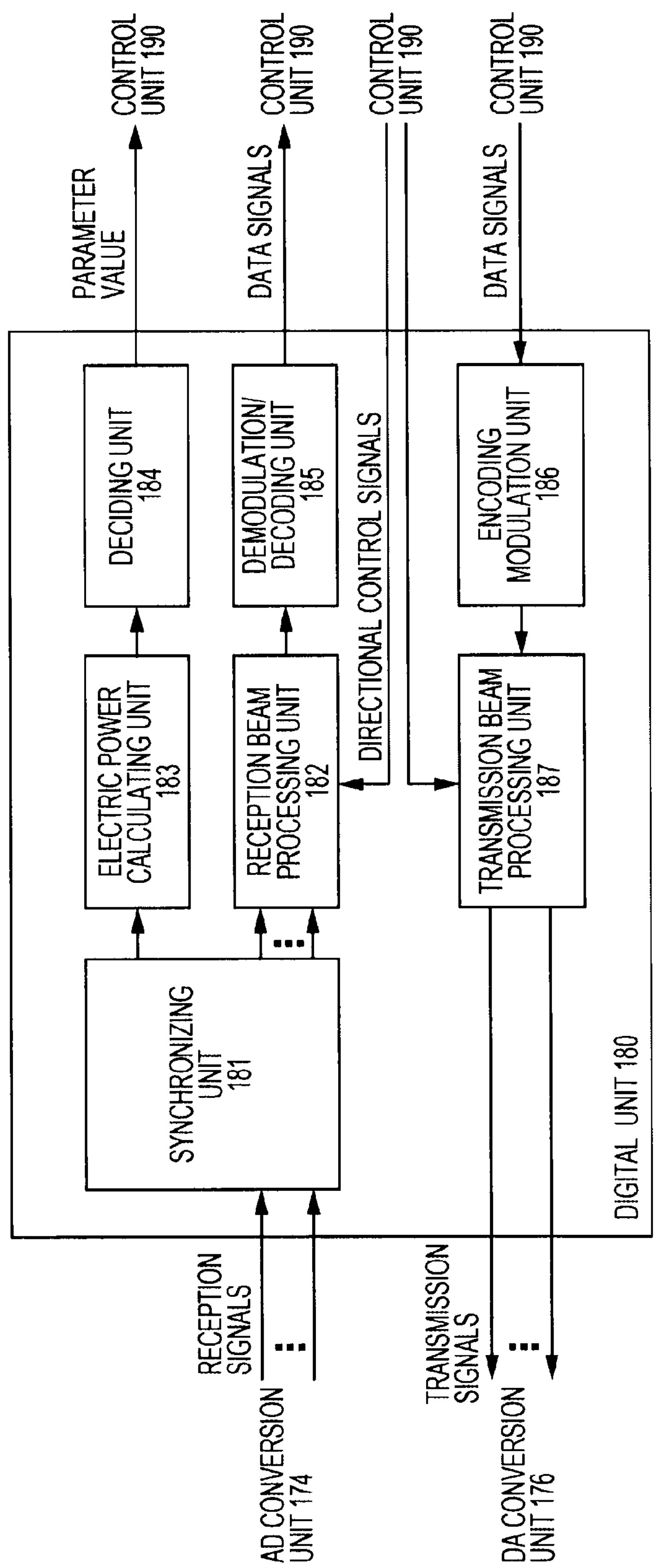
FIG. 3
CONTROL UNIT 190
CONTROL UNIT 190
CONTROL UNIT 190
CONTROL UNIT 190
PARAMETER VALUE
DATA SIGNALS
DATA SIGNALS
DECIDING UNIT 184
DEMODULATION/ DECODING UNIT 185
DIRECTIONAL CONTROL SIGNALS
ENCODING MODULATION UNIT 186
ELECTRIC POWER CALCULATING UNIT 183
RECEPTION BEAM PROCESSING UNIT 182
TRANSMISSION BEAM PROCESSING UNIT 187
SYNCHRONIZING UNIT 181
DIGITAL UNIT 180
RECEPTION SIGNALS
TRANSMISSION SIGNALS
AD CONVERSION UNIT 174
DA CONVERSION UNIT 176

| COMMUNICATION PARTY ID | BEAM PATTERN ID AT TIME OF TRANSMISSION/ RECEPTION OF LAST FRAME | PREAMBLE TYPE AT TIME OF TRANSMISSION/ RECEPTION OF LAST FRAME | TIME INFORMATION AT TIME OF TRANSMISSION/ RECEPTION OF LAST FRAME | THRESHOLD OF TIME ELAPSED |
|---|---|---|---|---|

STA-0
STA-1
TIME
TIME
RTS
RX
RX
CTS
DATA
RX
RX
ACK
(1200)
RTS
RX
RX
CTS
DATA
RX
DATA
RX
RX
ACK
(1201)
DATA
RX
RX
ACK
(1202)

COMMUNICATION DEVICE AND COMMUNICATION METHOD, COMPUTER PROGRAM, AND COMMUNICATION SYSTEM

TECHNICAL FIELD

The present invention relates to a communication device and communication method, a computer program, and a communication system, for performing beam pattern control using an array antenna, and more particularly relates to a communication device and communication method, a computer program, and a communication system, using access control based on physical carrier sense and beam pattern control in tandem.

BACKGROUND ART

Wireless communication is rapidly coming into common use, as a technology whereby the burden of wiring work of conventional cable communication can be resolved, and further, whereby mobile communication can be realized. Examples of typical standards relating to wireless LANs (Local Area Network) include IEEE (The Institute of Electrical and Electronics Engineers) 802.11 and IEEE 802.15.

Many wireless LAN systems use access control procedures based on carrier sense such as CSMA/CA (Carrier Sense Multiple Access with Collision Avoidance: Carrier Sense Multiple Access) so that individual communication stations can avoid carrier collision when performing random channel access.

FIG. 22 illustrates the way in which three communication stations STA-0, STA-1, and STA-1 each operating in its own communicable range. Also, FIG. 23 illustrates an example of a communication sequence based on CSMA/MA under a communication environment where three communication stations STA-0, STA-1, and STA-1 are operating. A communication station where a transmission request has occurred monitors the media state for a predetermined frame interval DIFS (Distributed Inter Frame Space), and if there is no transmission signal present during this time performs random backoff, and if there is no transmission signal present during even this time, obtains a transmission right and can transmit a frame.

Also, communication stations are permitted to transmit a frame (packet) after a shorter frame interval SIFS (Short Inter Frame Space) in the event of transmitting a frame with exceptionally high urgency such as an ACK. Accordingly, a frame with high urgency can be transmitted before a frame regarding which transmission performed following normal CSMA procedures.

Now, with wireless communication, there is known the occurrence of a problem called hidden node problem, in which there is a region where communication stations cannot directly communicate one with another. Hidden nodes cannot perform negotiation with each other, so there is the possibility that transmission operations will collide. One methodology for solving the hidden node problem is "virtual carrier sense". Specifically, in the event that Duration (elapsed time) information for reserving media is described within a received frame which is not addressed to itself, an assumption, i.e., virtual carrier sensing, is made that the media will be in used for the period corresponding to the Duration information, and a transmission stop period (NAV: Network Allocation Vector) is set.

Further, a typical example of a signal transmission/reception sequence using virtual carrier sense is an RTS/CTS handshake. The communication state which is the data originator transmits a transmission request frame (RTS: Request To Send), and in response to having received a confirmation notification frame (CTS: Clear To Send) from the communication station at the data destination, data transmission is started. Upon a hidden node receiving at least one frame of an RTS or CTS which is not addressed to itself, the transmission stop period is set based on the Duration information described in the received frame, so as to avoid collision. A hidden node as seen from the transmission station receives a CTS and sets a transmission stop period to avoid collusion with a data frame, and a hidden node as seen from the receiving station receives an RTS and stop transmission period to avoid collision with an ACK.

Using RTS/CTS handshake along with CSMA/CA control procedures can in some instances reduce overhead of collision in an overloaded state.

Now, array antenna technology is an example of a method for securing a good communication channel with a particular communication party. The beam pattern can be controlled by changing the transmission weight or reception weight for each antenna, and by orienting at least one of the transmission beam and reception beam in the direction in which the communication party is situated improves quality of the communication channel.

For example, a proposal has been made to improve antenna gain by performing transmission/reception with a base station forming a unique beam pattern for each mobile station, so as to provide a good communication path (e.g., see Patent Document 1).

Also, a proposal has been made regarding a communication method wherein the base station controls the directionality of the antenna when transmitting data signals but does not control directionality of the antenna when transmitting synchronization signals, and performs suitable processing in the event of multiplexed data signals existing in the same time period as with synchronization signals such as reducing the length of the synchronization signals, thereby effecting interference mitigation regarding a terminal device before synchronization has been established (e.g., see Patent Document 2).

FIG. 24 illustrates an example of a communication environment using array antenna technology. With the communication environment shown in FIG. 22, the communication stations STA-0, STA-1, and STA-2 do not generate a beam pattern addressed to a particular communication station, and each perform nondirectional (omni directional) transmission/reception with beam patterns Beam-1, Beam-1, and Beam-2. On the other hand, with the example shown in FIG. 24, the STA-0 which serves as the base station generates beam patterns with higher gain as to particular communication stations STA-1 and STA-2 to perform communication, such as Beam-01 and Beam-02 as to communication parties STA-1 and STA-2, respectively (in other words, focused onto STA-1 and STA-2). STA-1 and STA-2 serving as terminal stations each have nondirectional beam patterns Beam-1 and Beam-2, but the STA-0 transmits with the beam patterns Beam-01 and Beam-02 directed to each station. Accordingly, the reception SINR (Signal-to-Interference plus Noise power Ratio) at the STA-1 and STA-2 improves.

Also, a communication method employing the directionality of antennas is also applied to IEEE 802.15.3c which is a standard for wireless PAN (mmWPAN: millimeter-wave Wireless Personal Area Network) using millimeter wavebands. Millimeter wavebands have short wavelength and strong linearity even in comparison with microwaves widely used with wireless LAN technology, and can transmit very great amounts of information, but attenuation due to reflection is marked, and propagation loss is great, so wireless signals do not reach far. The range problem of millimeter wavebands can be supplemented by transmission/reception beam pattern control.

The beam pattern is generally calculated based on transmission channel information with a communication party. Accordingly, at the time of controlling beam patterns, reception signals from the communication party are necessary. With the communication environment operated with the STA-0 serving as the base station, the subordinate terminal stations STA-1 and STA-2 each periodically transmitting signals (signal) for updating (refreshing) the beam pattern to the STA-0 is a prerequisite. Also, in the event of performing transmission/reception of signals with a particular beam pattern, signal detection using a preamble is not performed. Preamble detection is performed only in the case of random channel access such as shown in FIG. 23, and transmission/reception for random channel access is performed with a different beam pattern as transmission/reception of data frames. For example, with the communication system shown in FIG. 24, the base station STA-0 uses beam patterns Beam-01 and Beam-02 directed toward the communication parties when performing transmission/reception of data frames with STA-1 and STA-2, but uses nondirectional beam pattern Beam-0 such as shown in FIG. 22 when performing random channel access.

Communication stations need to perform preamble detection at the time of performing access control based on physical carrier sense, in order to receive signals from unidentified nearby stations. On the other hand, in the event of performing communication where communication with a particular communication station is difficult unless a beam pattern is formed, performing access control based on physical carrier sense becomes difficult since signals from unidentified stations cannot be received if a beam pattern is formed.

With a system such as according to the aforementioned Patent Documents 1 and 2 where communication is performed with beam patterns for particular communication stations under a base station and beam patterns for unidentified communication stations being separately formed, there is no particular problem for performing channel sharing without access control based on physical carrier sense. On the other hand, in a case such as the airwave bandwidth being an unlicensed band, channel sharing by access control based on physical carrier sense is desirable. For example, with a private network such as a wireless LAN using millimeter wavebands, it is thought that there is the need to use access control based on physical carrier sense and beam pattern control, in tandem.

CITATION LIST

Patent Document

Patent Document 1: Japanese Unexamined Patent Application Publication No. 2004-72539

Patent Document 2: Japanese Unexamined Patent Application Publication No. 2007-324773

DISCLOSURE OF INVENTION

Technical Problem

It is an object of the present invention to provide a communication device and communication method, a computer program, and a communication system, which can enable beam pattern control to be suitably performed using an array antenna, in order to improve communication quality with a communication method using millimeter wavebands, for example.

It is a further object of the present invention to provide a communication device and communication method, a computer program, and a communication system, which can enable suitable beam control while performing access control based on physical carrier sense, in a communication environment where the airwave band is an unlicensed band, for example.

Technical Solution

The Present Application has been made in light of the above problems, and the invention according to claim 1 is a communication device, including:

an antenna capable of controlling beam patterns;

a beam pattern controlling unit for controlling beam patterns of the antenna; and a control unit for controlling frame transmission/reception procedures, and instructing control of beam patterns of the antenna by the beam pattern controlling unit following the frame transmission/reception procedures;

wherein, at the time of frame transmission, the control unit selects one of multiple types of preamble types with different preamble lengths, and performs frame transmission.

With the invention according to Claim 2 of the Present Application, the communication device according to Claim 1 is configured such that, at the time of frame transmission, the control unit instructs control of the beam pattern by the beam pattern controlling unit.

With the invention according to Claim 3 of the Present Application, the communication device according to Claim 2 is configured such that, in the event that the control unit does not instruct control of the beam pattern by the beam pattern control unit, a preamble type having a longer preamble length is selected and frame transmission is performed, and in the event that the control unit instructs control of the beam pattern by the beam pattern control unit so as to form a beam pattern focused on the frame transmission destination, a preamble type having a shorter preamble length is selected and frame transmission is performed.

With the invention according to Claim 4 of the Present Application, the communication device according to Claim 2 further includes a storage unit for holding transmission/reception history with the frame transmission destination, and at the time of frame transmission, the control unit selects one of a plurality of preamble types with different preamble lengths based on the transmission/reception history with the frame transmission destination, and instructs control of the beam pattern by the beam pattern control unit, and performs frame transmission.

With the invention according to Claim 5 of the Present Application, the communication device according to Claim 4, is configured such that the control unit holds transmission/reception time information of the last time with the frame transmission destination in the storage unit as the transmission/reception history. Also, at the time of frame transmission, the control unit selects one of a plurality of preamble types with different preamble lengths based on the elapsed time from the last transmission/reception point-in-time with the frame transmission destination, and instructs control of the beam pattern by the beam pattern control unit, and performs frame transmission.

With the invention according to Claim 6 of the Present Application, the communication device according to Claim 2 is configured such that, in a case of applying RTS/CTS transmission/reception procedures, in the event of operating as the data reception side, the control unit instructs the beam pattern control unit to form a beam pattern directed to the frame transmission destination based on reception signals in the event of having received an RTS frame from the frame transmission destination. Also, in the event of operating as the data transmission side in RTS/CTS transmission/reception, the configuration is such that the control unit instructs the beam pattern control unit to form a beam pattern used in the event of transmitting data frames to the frame transmission destination based on reception signals in the event of having received a CTS frame from the frame transmission destination.

With the invention according to Claim 7 of the Present Application, the communication device according to Claim 6 is configured such that, at the time of transmitting a data frame to the frame transmission destination using a beam pattern formed based on the CTS frame received from the frame transmission destination, the control unit selects a preamble type with a shorter preamble length.

With the invention according to Claim 8 of the Present Application, the communication device according to Claim 6 is configured such that, in the event of judging that the beam pattern used at the time of the last data frame transmission is valid, the control unit consecutively transmits data frames using the same beam pattern, without performing transmission of an RTS frame.

With the invention according to Claim 9 of the Present Application, the communication device according to Claim 6 is configured such that, in the event of judging that the beam pattern used at the time of the last data frame transmission is valid, the control unit transmits data frames with the rate of pilot symbols inserted in a payload portion reduced.

With the invention according to Claim 10 of the Present Application, the communication device according to Claim 5 is configured such that the control unit holds an elapsed time threshold as to the frame transmission destination in the storage unit as the transmission/reception history. At the time of frame transmission, the control unit references the transmission/reception history held in the storage unit, and in the event that the elapsed time from the last transmission/reception point-in-time with the frame transmission destination is within the threshold, selects the preamble type or beam pattern used at for frame transmission the last time, and on the other hand, in the event that the elapsed time from the last transmission/reception point-in-time with the frame transmission destination exceeds the threshold, selects a preamble type having a preamble length longer than that used for frame transmission the last time, or invalidates the beam pattern used at for frame transmission the last time.

With the invention according to Claim 11 of the Present Application, the communication device according to Claim 10 is configured such that the control unit increases the threshold value in accordance with frame transmission/reception processing with the frame transmission destination succeeding, and reduces the threshold value in accordance with frame transmission/reception processing with the frame transmission destination failing.

Also, the invention according to Claim 12 of the Present Application is a communication method using an antenna capable of controlling beam patterns and controlling frame transmission/reception procedures, and also controlling beam patterns of the antenna following the frame transmission/reception procedures, the method including the step of:

selecting one of multiple types of preamble types with different preamble lengths, and performing frame transmission.

Also, the invention according to Claim 13 of the Present Application is a computer program described in a computer-readable format, so as to execute control of communication operations using an antenna capable of controlling beam patterns, the program causing the computer to function as:

a beam pattern controlling unit for controlling beam patterns of the antenna; and a control unit for controlling frame transmission/reception procedures, and instructing control of beam patterns of the antenna by the beam pattern controlling unit following the frame transmission/reception procedures;

wherein, at the time of frame transmission, the control unit selects one of multiple types of preamble types with different preamble lengths, and performs frame transmission.

The invention according to Claim 13 of the Present Application defines a computer program described in a computer-readable format, so as to execute predetermined processing on a computer. In other words, installing the computer program according to Claim 13 of the Present Application in a computer exhibits cooperative operations on the computer, whereby advantages the same as with the communication device according to Claim 1 of the Present Application can be obtained.

Also, the invention according to Claim 14 of the Present Application is a communication system including:

a communication device including an antenna capable of controlling beam patterns, a beam pattern controlling unit for controlling beam patterns of the antenna, and a control unit for controlling frame transmission/reception procedures, and instructing control of beam patterns of the antenna by the beam pattern controlling unit following the frame transmission/reception procedures, wherein, at the time of frame transmission, the control unit selects one of multiple types of preamble types with different preamble lengths, and performs frame transmission; and a communication device serving as a frame transmission destination.

It should be noted that "system" as used here means a logical group of multiple devices (or function modules realizing particular functions), and whether the devices or function modules are within a single casing is irrelevant.

Advantageous Effects

According to the present invention, an excellent communication device and communication method, a computer program, and a communication system, which can perform beam pattern control using an array antenna in order to solve the range problem and improve communication quality and so forth in a communication method using millimeter waveband for example, can be provided.

Also, according to the present invention, an excellent communication device and communication method, a computer program, and a communication system, which can perform suitable beam pattern control while performing access control based on physical carrier sense in a communication environment where the airwave band is an unlicensed band for example, can be provided.

With communication systems using millimeter waveband and so forth, a method is employed in which a beam pattern is focused toward a particular communication party in order to secure a good communication channel with the communication party. However, in the event that a considerable amount of time has elapsed since the last transmission/reception with the communication party, or with a first-time communication party, information of a valid beam pattern cannot be held. Regarding this, according to Claims 1, 12, and 14 of the Present Application, the communication party can perform signal detection even with a low reception SINR by selecting a preamble type with a longer preamble length to transmit frames, while sacrificing transmission overhead. Conversely, in the event of a state where reception SINR is sufficiently high due to performing beam pattern control, transmission overhead can be suppressed by selecting a preamble type with a shorter preamble length.

With the invention according to Claim 2 of the Present Application, the communication device can selectively decide the preamble length to be used at the same time as selecting the beam pattern.

With the invention according to Claim 3 of the Present Application, access control can be performed based on signal detection even in a state with low reception SINR without performing beam pattern control, by transmitting a frame having a long preamble length. Also, with the invention according to Claim 3 of the Present Application, in the event that the reception SINR at the communication party can be improved by beam pattern control, the transmission overhead can be suppressed by selecting a preamble type with a shorter preamble length.

With the invention according to Claim 4 of the Present Application, the communication device can hold transmission/reception history such as the beam pattern and preamble type used for transmission/reception the last time in a storage unit. Also, with the invention according to Claim 4 of the Present Application, in the event that judgment is made that a valid beam pattern is not held based on the transmission/reception with the communication party, the communication party can perform signal detection even with a low reception SINR by selecting a preamble type with a longer preamble length to transmit frames, while sacrificing transmission overhead. Also, with the invention according to Claim 4 of the Present Application, in the event that judgment is made that a valid beam pattern is held based on the transmission/reception with the communication party, the reception SINR at the communication party can be improved by beam pattern control, so the transmission overhead can be suppressed by selecting a preamble type with a shorter preamble length.

The transmission/reception history such as the beam pattern and preamble type used for frame transmission/reception the last time and so forth is valid as long as the channel with the communication party does not change. Generally, channels change over time. Taking this point into consideration, with the invention according to Claim 5 of the Present Application, the validity of the beam pattern and preamble type (preamble length) held as transmission/reception history can be judged, based on the elapsed time from the last time of transmission/reception with the same communication party.

In the event of following predetermined transmission/reception procedures such as with RTS/CTS handshake, frame exchange is performed at short frame intervals, expecting that the beam pattern secured at the time of frame exchange immediately before is valid. Accordingly, with the invention according to Claim 6 of the Present Application, the communication device uses the beam pattern secured at the time of frame exchange immediately before, whereby the reception SINR can be improved. Also, with the invention according to Claim 7 of the Present Application, the transmission overhead can be suppressed at the time of RTS/CTS handshake by selecting a preamble type with a shorter preamble length, expecting that reception SINR at the frame transmission destination will improve.

With the invention according to Claim 8 of the Present Application, in the event that judgment is made that the beam pattern used at the time of data frame transmission the last time is valid, the transmission overhead can be suppressed by consecutively transmitting data frames, omitting the RTS/CTS handshake.

With the invention according to Claim 9 of the Present Application, in the event that judgment is made that the beam pattern used at the time of data frame transmission the last time is valid, the transmission overhead can be suppressed by consecutively transmitting data frames with the rate of pilot symbols inserted in the payload reduced.

With the invention according to Claim 10 of the Present Application, the elapsed time threshold for each frame transmission destination is managed as transmission/reception history, and the validity of the preamble type and beam type used for frame transmission/reception the last time can be judged by comparing the elapsed time from the transmission/reception point-in-time with the frame transmission destination, with the relevant threshold.

With the invention according to Claim 11 of the Present Application, it can be judged that a communication party to which frames can be delivered properly has little change in channel state, so the beam pattern can be made to be valid over a long period by increasing the elapsed time threshold, and consequently, transmission overhead can be suppressed, and information transmission can be made more efficient. On the other hand, it can be judged that a communication party to which frames cannot be delivered properly has great change in channel state, so transmission error can be suppressed by updating beam pattern in a short time, by reducing the elapsed time threshold.

Further objects, features, and advantages of the present invention will become apparent from detailed description based on the later-described embodiment of the present invention and the attached drawings.

BRIEF DESCRIPTION OF DRAWINGS

FIG. 3 is a diagram illustrating an example of the internal configuration of a digital unit 180.

DESCRIPTION OF EMBODIMENTS

Now, an embodiment of the present invention will be described in detail with reference to the drawings. Note that while the VHT (Very High Throughput) standard using the 60 GHz band millimeter waveband can be exemplified as a communication format for performing beam pattern control, the essence of the present invention is not restricted to a particular frequency band. Also, in order to obtain desired properties of antenna directionality, there is the need to control the amplitude and phase distribution on the antenna.

Configuring an antenna array by arraying multiple half-wave dipole antennas and slit antennas, and controlling the excitation amplitude and phase of each antenna element allows directionality to be controlled in a more fine manner, and the direction of beams can be temporally changed. While performing beam pattern control of the antennas is imperative for realizing the present invention, the essence of the present invention is not restricted to a particular array antenna structure.

Figure 1:
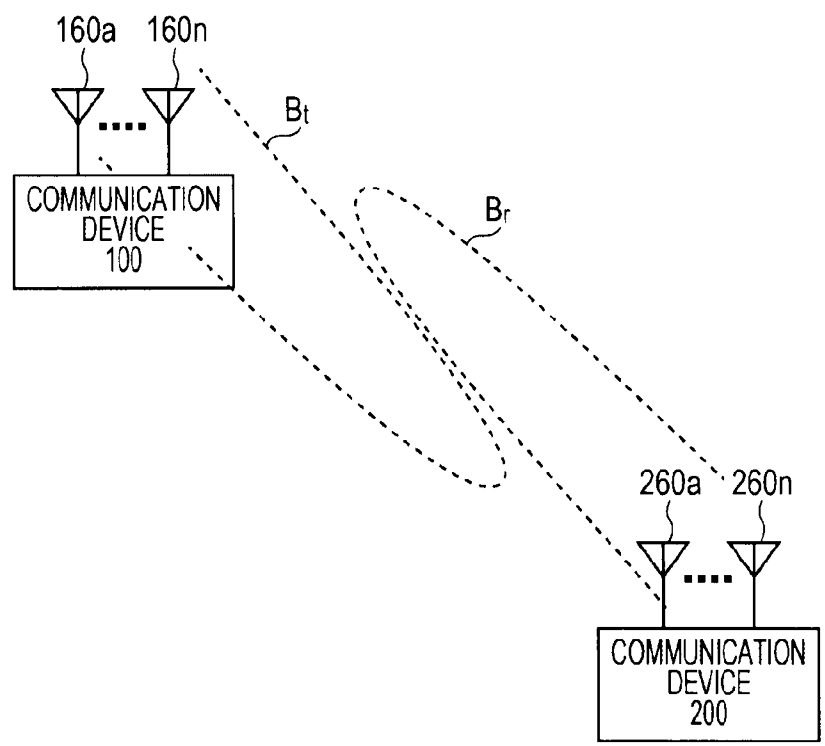
FIG. 1 is a diagram illustrating a configuration example of a wireless communication system according to an embodiment of the present invention.

FIG. 1 schematically illustrates a configuration example of a wireless communication system according to an embodiment of the present invention. In the drawing, the wireless communication system is made up of a communication device 100 and a communication device 200. Millimeter waves are used with this system. Since the millimeter waveband communication method has a range problem in that linearity is strong and attenuation at the time of reflection is great, wireless signals are transmitted/received by transmission beams and reception beams being directed toward the communication party. Also, we will say that the airwave band used with this system is an unlicensed band, and that channel sharing is performed by access control based on physical carrier sense.

With the example shown in FIG. 1, the communication device 100 has multiple antennas 160*a* through 160*n* for performing transmission/reception of wireless signals following the millimeter waveband communication method. The directionality $B_t$ of the transmission beam is controlled by the weight of the signals transmitted via the antennas 160*a* through 160*n* being adjusted. In the example illustrated in the drawing, the transmission beam $B_t$ is directed in the direction of the position of the communication device 200 which is the communication party thereof.

Also, the communication device 200 has multiple antennas 260*a* through 260*n* for performing transmission/reception of wireless signals following the millimeter waveband communication method. The directionality of the reception beam $B_r$ is controlled by the weight of the signals received via the antennas 260*a* through 260*n* being adjusted. In the example illustrated in the drawing, the reception beam $B_r$ is directed in the direction of the position of the communication device 100 which is the communication party thereof.

Figure 2:
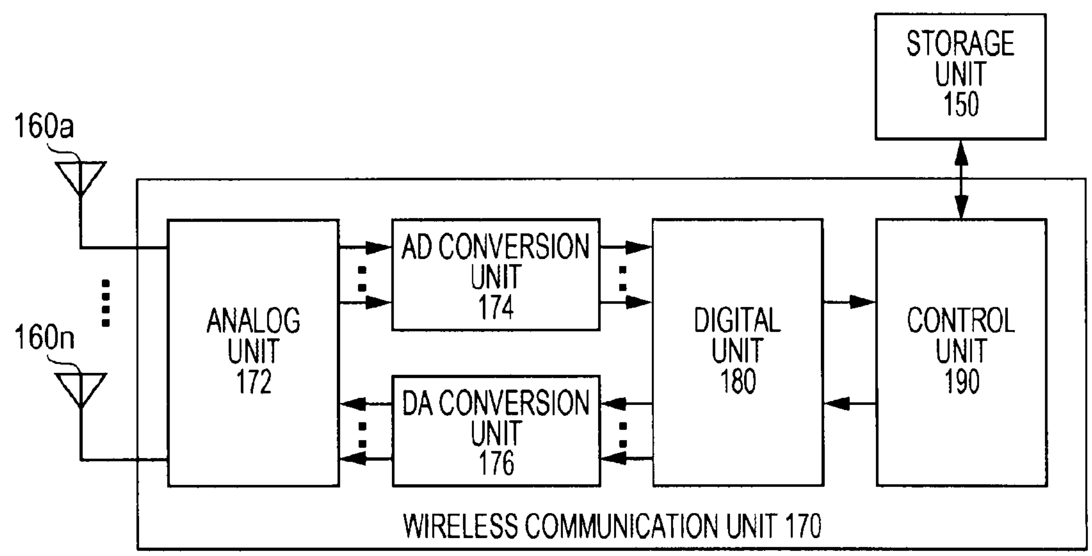
FIG. 2 is a diagram illustrating a configuration example of a communication device 100.

FIG. 2 illustrates a configuration example of the communication device 100. The communication device 100 may operate as a broadband router or wireless access point. Note that, while not illustrated in the drawing, the configuration of the communication device 200 may be the same.

The communication device 100 has a storage unit 150, multiple antennas 160*a* through 160*n*, and a wireless communication unit 170. The wireless communication unit 170 has an analog unit 172, an AD conversion unit 174, a DA conversion unit 176, a digital unit 180, and a control unit 190.

The multiple antennas 160*a* through 160*n* are used for wireless communication following the millimeter waveband communication method. The antennas 160*a* through 160*n* make up an array antenna, in which the beam direction can be temporally changed by controlling the excitation amplitude and phase of each. Specifically, wireless signals weighted using predetermined weighting coefficients are transmitted from each of the antennas 160*a* through 160*n* using millimeter waves, and also the millimeter waveband wireless signals received at each of the antennas 160*a* through 160*n* are received using predetermined weighting coefficients.

The analog unit 172 typically is equivalent to an RF circuit for performing transmission/reception of wireless signals following the millimeter waveband communication method. That is to say, the analog unit 172 performs low noise amplification of the multiple reception signals received by each of the antennas 160*a* through 160*n*, and also performs down-conversion thereof, and outputs to the AD conversion unit 174. Also, the analog unit 172 performs up-conversion to RF band of multiple transmission singles each converted into analog signals by the DA conversion unit 176, and also performs power amplification, and outputs to the antennas 160*a* through 160*n*.

The AD conversion unit 174 converts each of the multiple analog reception signals input from the analog unit 172 into digital signals, and outputs to the downstream digital unit 180. Also, the DA conversion unit 176 converts each of the multiple digital transmission signals input from the digital unit 180 into analog signals, and outputs to the analog unit 172.

The digital unit 180 typically is configured of a circuit for demodulating and decoding reception signals following the millimeter waveband communication method, and a circuit for encoding and modulating transmission signals following the millimeter waveband communication method.

FIG. 3 illustrates an example of the internal configuration of the digital unit 180. As shown in the drawing, the digital unit 180 includes a synchronizing unit 181, a reception beam processing unit 182, an electric power calculating unit 183, a deciding unit 184, a demodulation/decoding unit 185, an encoding modulation unit 186, and a transmission beam processing unit 187.

Regarding multiple reception signals received by the multiple antennas 160*a* through 160*n*, for example, the synchronizing unit 181 synchronizes the start timing of reception processing in accordance with the preambles at the start of the frames, and outputs to the reception beam processing unit 182. The synchronizing unit 181 can obtain the synchronization timing based on correlation information such as self correlation or mutual correlation of the received preambles, for example.

Figure 4:
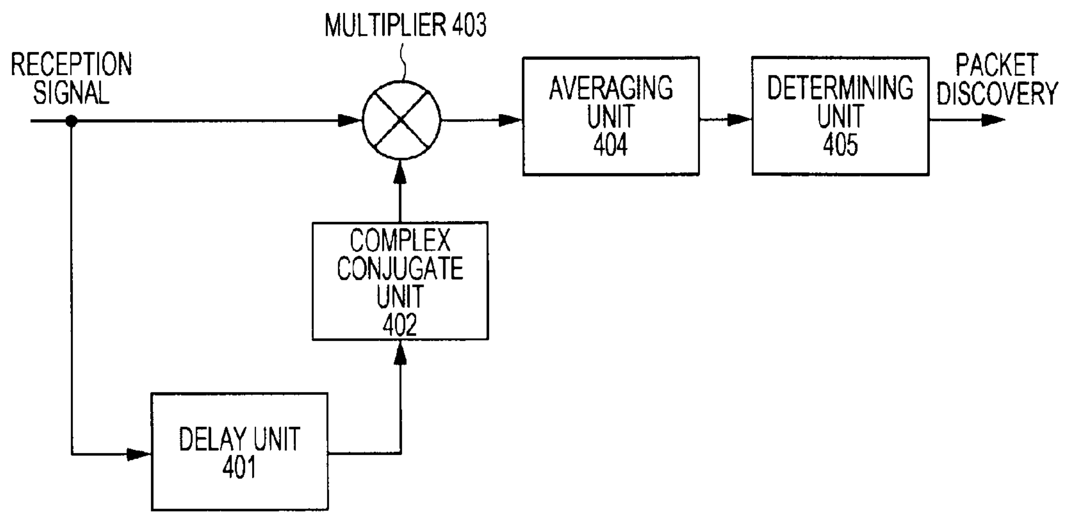
FIG. 4 is a diagram illustrating a configuration example of a correlation processing circuit detecting a preamble by self correlation.

FIG. 4 illustrates a configuration example of a correlation processing circuit for detecting preambles by self correlation.

A delay unit 401 holds reception signals for a time interval equivalent to known training sequence repetition cycle included in the preamble, and outputs as a delay signal. Also, a complex conjugate unit 402 obtains a complex conjugate of the delay signal. A multiplier 403 then performs complex conjugate multiplication between the reception signal and the delay signal equivalent to the known training sequence repetition cycle interval. An averaging unit 404 calculates a moving average of the product which the multiplier 403 calculates over a predetermined moving average section, and obtains a self correlation value. A determining unit 405 discovers arrival of frame or signals at a timing at which this self correlation value exceeds a predetermined threshold.

Figure 5:
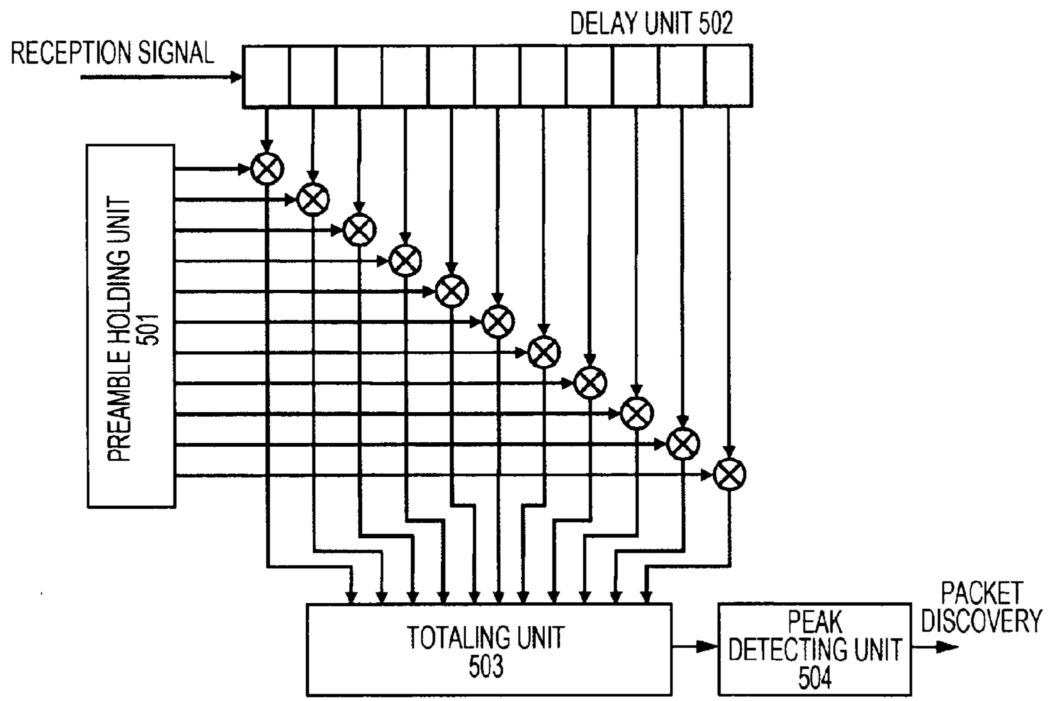
FIG. 5 is a diagram illustrating a configuration example of a correlation processing circuit detecting a preamble by mutual correlation.

Also, FIG. 5 illustrates a configuration example of a correlation processing circuit for detecting a preamble by self correlation.

A delay unit 502 is configured of multiple delay elements, each having a delay time equivalent to a sample cycle, which are serially connected, so as to provide a delay time of a timing estimation section overall. On the other hand, a preamble holding unit 501 holds a pattern of a known training sequence. Reception signal samples are thus delayed one sample at a time at the delay elements of the delay unit 502, each of the delay signals are multiplied by the pattern held by the preamble holding unit 501, and these are totaled at a totaling unit 503 and the inner product is obtained, whereby a mutual correlation value can be obtained. A peak detecting unit 504 takes the peak position of the mutual correlation value as the estimation timing.

With the communication system according to the present embodiment, multiple types of preambles with different lengths can be selectively used, which will be described later. The synchronizing unit 181 has multiple correlation processing circuit modules corresponding to the types of preambles with different lengths, which are operated in parallel, thereby enabling frames of which the preamble type is unknown, i.e., arbitrary preamble lengths, to be obtained.

The reception beam processing unit 182 performs weighting processing on the multiple reception signals input from the synchronizing unit 181, following a uniform distribution or Taylor distribution for example, thereby controlling the directionality of the reception beam. The reception beam processing unit 182 then outputs the weighted reception signals to the electric power calculating unit 183 and demodulation/decoding unit 185.

In the event of learning or updating an optimal transmission/reception beam direction, the electric power calculating unit 183 calculates the reception power of reception signals subjected to transmission/reception in each transmission/reception beam direction, and sequentially outputs to the deciding unit 184.

Figure 6:
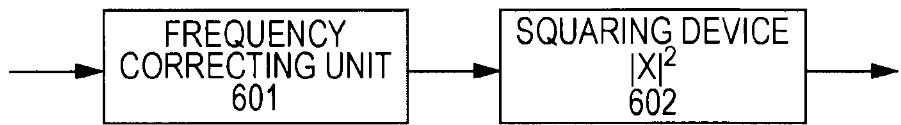
FIG. 6 is a diagram illustrating an internal configuration example of an electric power calculating unit 183.

FIG. 6 illustrates an internal configuration example of the electric power calculating unit 183. A frequency correcting unit 601 corrects frequency offset of reception signals. A squaring device 602 calculates the square value of reception signals X, whereby the signal power can be obtained.

The deciding unit 184 decides the optimal transmission beam direction and optimal reception beam direction, based on the reception power value input from the electric power calculating unit 183. Parameter values for identifying the decided beam directions are stored in the storage unit 150 via the control unit 190. Optimal beam direction as used here typically is equivalent to a beam direction at which the series of reception power values input from the electric power calculating unit 183 regarding one beam learning signal becomes the greatest value.

The demodulation/decoding unit 185 demodulates and decodes the reception signals weighted by the reception beam processing unit 182 following an optional modulation format and encoding format used with the millimeter waveband communication method, so as to obtain data signals. The demodulation/decoding unit 185 then outputs the obtained data signals to the control unit 190.

The encoding modulation unit 186 performs encoding and modulation of the data input from the control unit 190 following the optional modulation format and encoding format used with the millimeter waveband communication method, so as to generated transmission signals. The encoding modulation unit 186 then outputs the generated transmission signals to the transmission beam processing unit 187.

The transmission beam processing unit 187 generates multiple transmission signals weighted following a uniform distribution or Taylor distribution for example, from the transmission signals input from the encoding modulation unit 186, thereby controlling the directionality of the transmission beam. The weighting value used by the transmission beam processing unit 187 is specified by directionality control signals input from the control unit 190, for example. The multiple transmission signals weighted by the transmission beam processing unit 187 are each output to the DA conversion unit 176.

Let us return to FIG. 2 and continue description of the configuration of the wireless communication device 100. The control unit 190 is configured using a computing device such as a microprocessor for example, and controls operations in general within the wireless communication unit 170, including processing of the MAC (Medial Access Control) layer. For example, media access control following CSMA/CA procedures is included. Upon obtaining parameter values for identifying the optimal transmission beam direction and reception beam direction from the storage unit 150, the control unit 190 outputs a directionality control signal, instructing the antennas 160*a* through 160*n* to be given a weighting coefficient so as to form the beam directions identified based on the parameter values, to the transmission beam processing unit 187 within the digital unit 180. Thus, an optimal beam pattern is formed in which a transmission beam or reception beam for wireless transmission, following the millimeter waveband communication method by the wireless communication device 100, is directed toward the position of the communication party.

Also, processing of the MAC layer which the control unit 190 performs includes medial access control following CSMA/CA procedures, for example. The control unit 190 stores transmission/reception history at the time of having performed transmission/reception of frames following a MAC layer protocol or the like, in the storage unit 150, and also decides beam patterns to be used for frame transmission/reception the next time, based on the stored transmission/reception history, which will be described in detail later.

Figure 7:
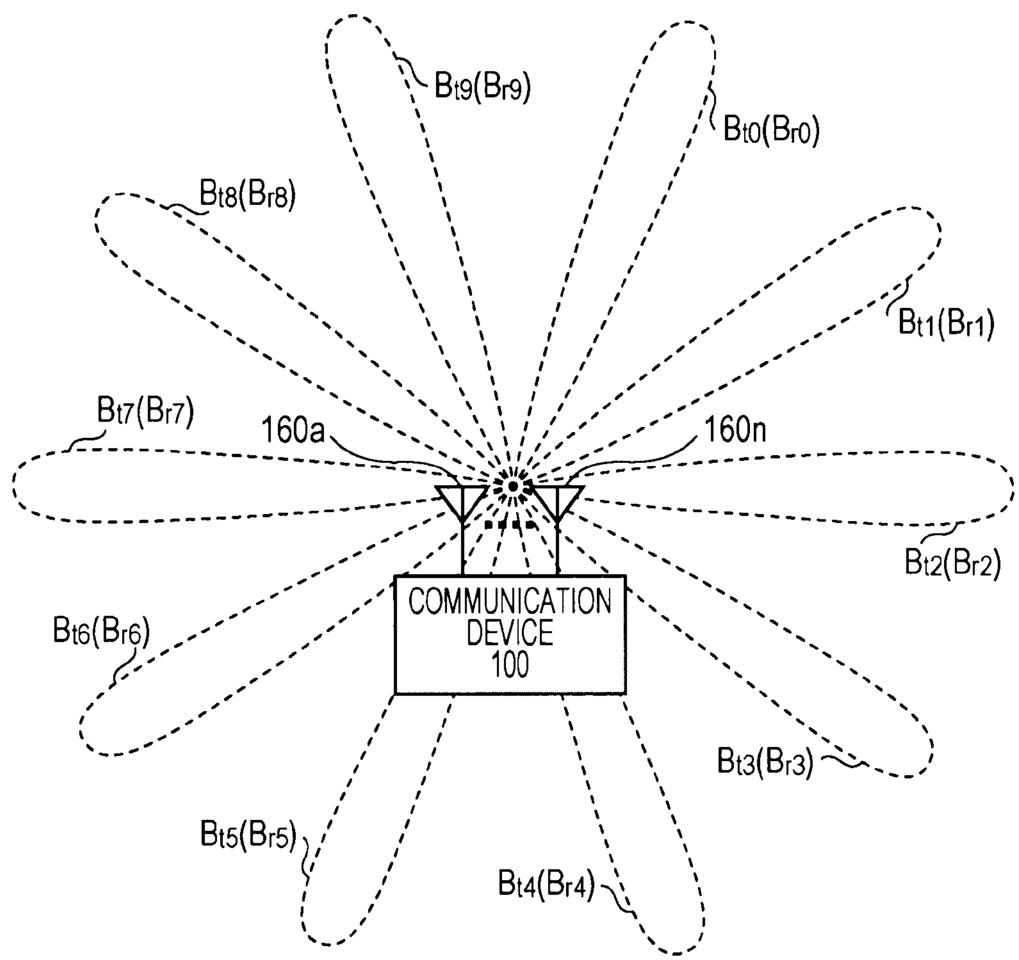
FIG. 7 is a diagram illustrating an example of a transmission beam pattern which the communication device 100 can form by directionality control of a transmission beam by way of a transmission beam processing unit 187.

FIG. 7 illustrates an example of transmission beam patterns which the communication device 100 can form by directionality control of the transmission beam by the transmission beam processing unit 187. The communication device 100 can form ten transmission beam pattern elements $B_{t0}$ through $B_{t9}$. The transmission beam pattern elements $B_{t0}$ through $B_{t9}$ each have directionality in directions each different by 36 degrees on a plane where the communication device 100 is situated.

The transmission beam processing unit 187 provides weighting coefficients to the antennas 160*a* through 160*n* in accordance to the directionality control signals from the control unit 190, and thus can form a transmission beam pattern of one of the ten beam pattern elements $B_{t0}$ through $B_{t9}$ (or a combination of two or more) and transmit directional wireless signals.

Reception beam patterns which can be formed by the communication device 100 may also be beam patterns the same as with the transmission beams $B_{t0}$ through $B_{t9}$ shown in FIG. 7. That is to say, the reception beam processing unit 182 provides weighting coefficients to the antennas 160*a* through 160*n* in accordance to the directionality control signals from the control unit 190, and thus can form a reception beam pattern matching a reception beam pattern of one of the ten beam pattern elements $B_{r0}$ through $B_{r9}$ (or a combination of two or more), and receive wireless signals following the millimeter waveband communication format at the antennas 160*a* through 160*n*.

The storage unit 150 of the communication device 100 stores beforehand parameter values for identifying weighting coefficients for each of the antennas 160*a* through 160*n*, to form each of the transmission/reception transmission beam pattern elements $B_{t0}$ through $B_{t9}$ and $B_{r0}$ through $B_{r9}$.

Note that transmission beam patterns and reception beam patterns which can be formed by the communication device 100 are not restricted to the example shown in FIG. 7. For example, the multiple antennas 160*a* through 160*n* can be configured such that transmission beam patterns or reception beam patterns can be formed having directionality in various directions in three-dimensional space.

Figure 8:
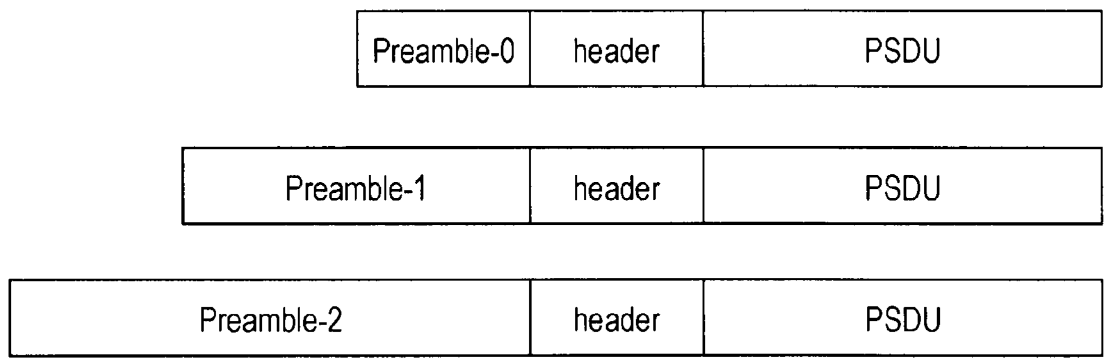
FIG. 8 is a diagram illustrating frame format examples with different preamble lengths.

With the communication system according to the present embodiment, multiple types of preambles with different lengths are stipulated (described above), and one of these can be selectively used. FIG. 8 illustrates an example of frame formats with different preamble types (preamble lengths). With the example shown in the drawing, three types of frame formats are shown, with a Preamble-0 having the shortest length, a Preamble-2 having the longest length, and a Preamble-1 having an intermediate length. We will say that the configuration of each frame is the same after the header portion. The header portion has control information described therein necessary for reception of a payload (PSDU). PSDU (PLCP Service Data Unit) is a service data unit which PLCP (Physical Layer Convergence Procedure) is responsible for delivering, and is equivalent to a MAC frame including a MAC header.

The longer the preamble length is, the higher the signal detection capability is (widely known). The reason is that by using a long preamble, the reception side can use more symbols for signal detection, and the signal is detected even if the reception SINR is low. Accordingly, in the event of performing signal detection processing based on CSMA/CA in a state of not forming beams in a communication environment where signals will not reach unless a beam pattern is formed toward the communication party, it is conceivable to use frames with longer preamble lengths. On the other hand, from the perspective that long preambles lead to transmission overhead, the shorter the preamble length, the better.

To summarize, Preamble-0 which is the short preamble is preferable for reducing overhead, but requires a high SINR for signal discovery. On the other hand, Preamble-2 which is the long preamble has a problem that the overhead increases, but signal discovery can be made even with a lower SINR.

With the present embodiment, the communication device 100 is arranged to selectively determine the preamble length to be used at the same time as selecting the beam pattern, which will be described in detail later. More specifically, by transmitting frames with Preamble-2 which is the long preamble, access control can be performed based on signal detection even in a state where beam pattern control is not performed and reception SINR is low. On the other hand, by performing beam pattern control, transmission overhead can be suppressed by transmitting frames having shorter preambles under an environment where the reception SINR has been made sufficiently high by performing beam pattern control.

Figure 22:
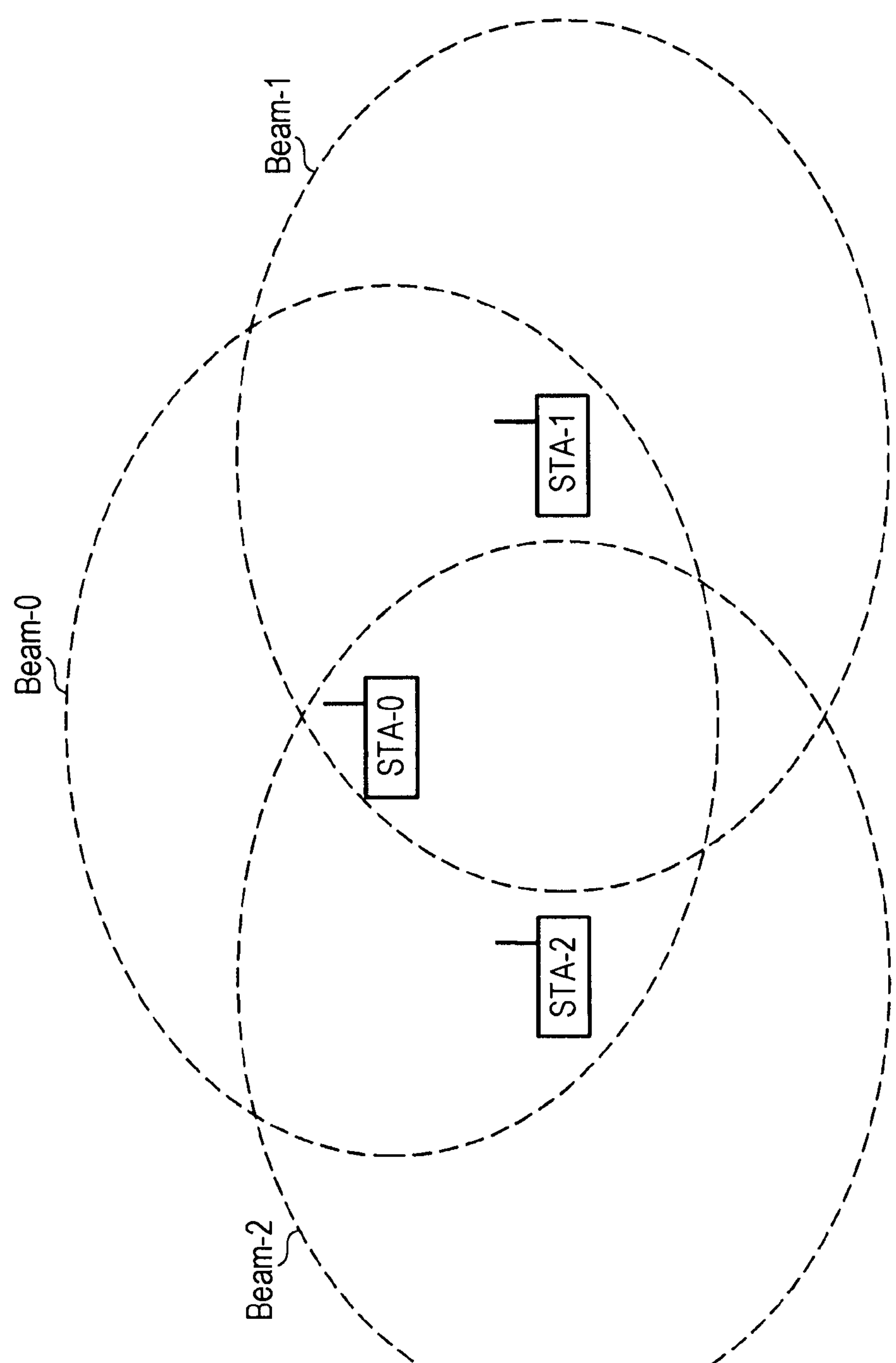
FIG. 22 is a diagram illustrating a communication environment wherein each communication station performs transmission/reception operations using nondirectional beam patterns.
Figure 23:
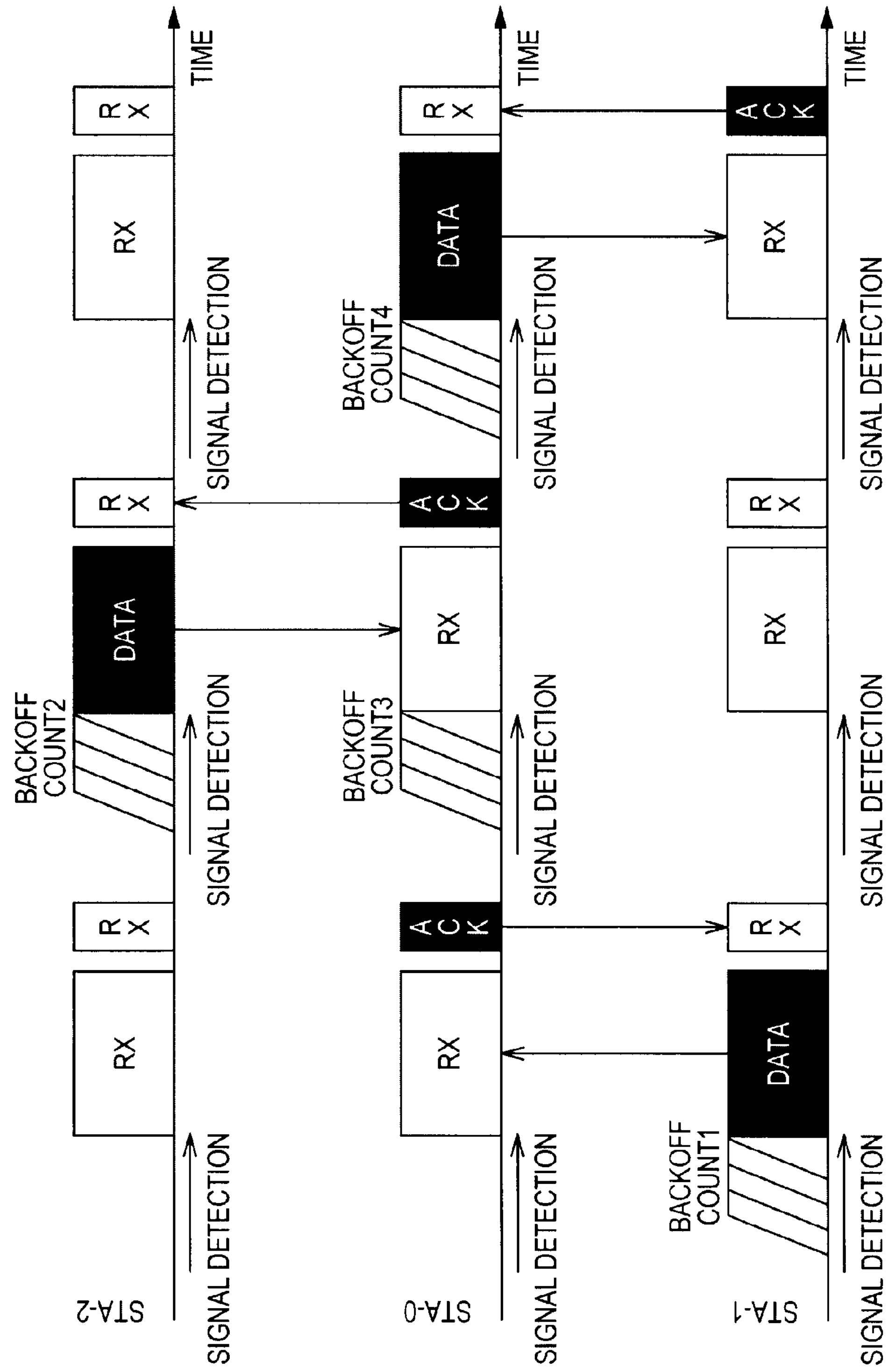
FIG. 23 is a diagram illustrating a communication sequence example based on CSMA/MA among three communication stations STA-0, STA-1, and STA-2 following CSMA/CA procedures.

FIG. 22 exemplifies a communication environment where the communication stations STA-0, STA-1, and STA-2 each perform transmission/reception with nondirectional (omni directional) beam patterns Beam-1, Beam-1, and Beam-2. Signals regarding which such beam patterns have not been formed can be expected to be received with a low SINR value at the transmission destination, so it is suitable for the frame transmission originator to use a preamble type having the Preamble-2 which is the long preamble.

Figure 24:
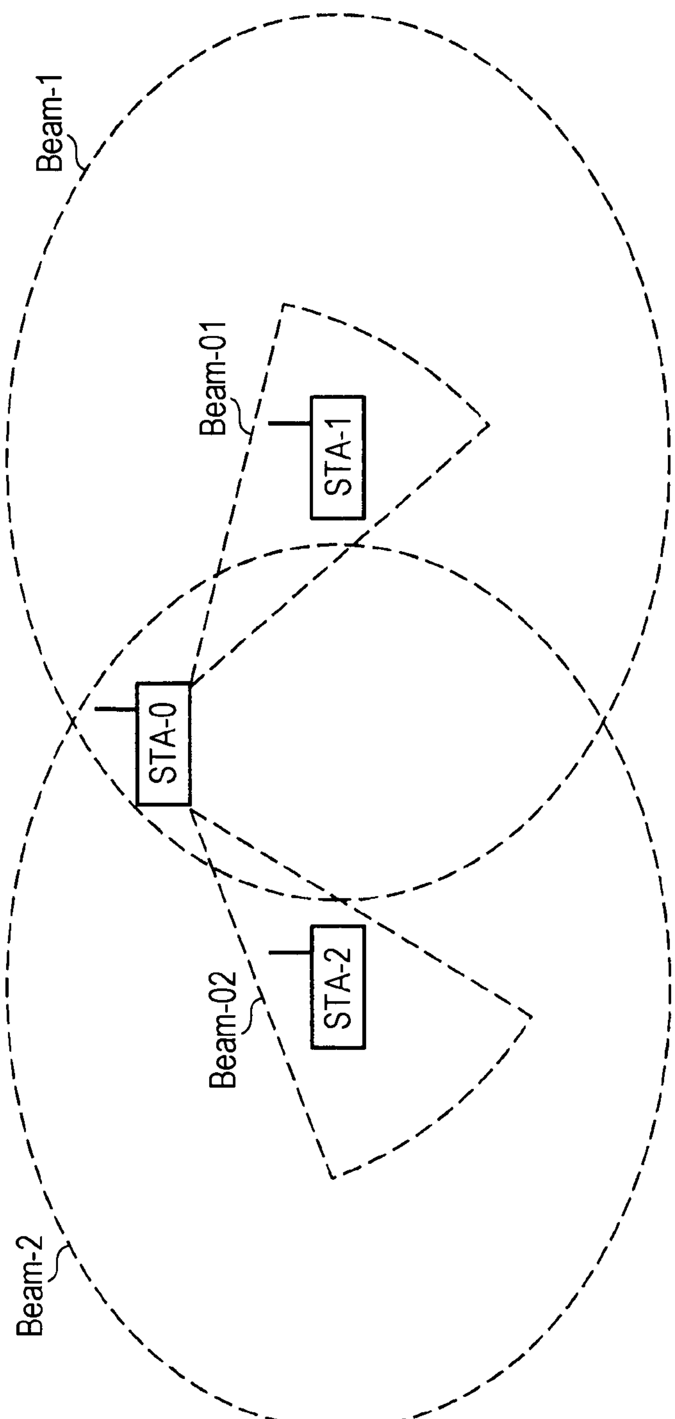
FIG. 24 is a diagram illustrating a communication environment wherein transmission/reception is performed with just a base station forming beam patterns in which gain is increased as to the terminal stations, and on the other hand the terminal stations using nondirectional beam patterns.
Figure 25:
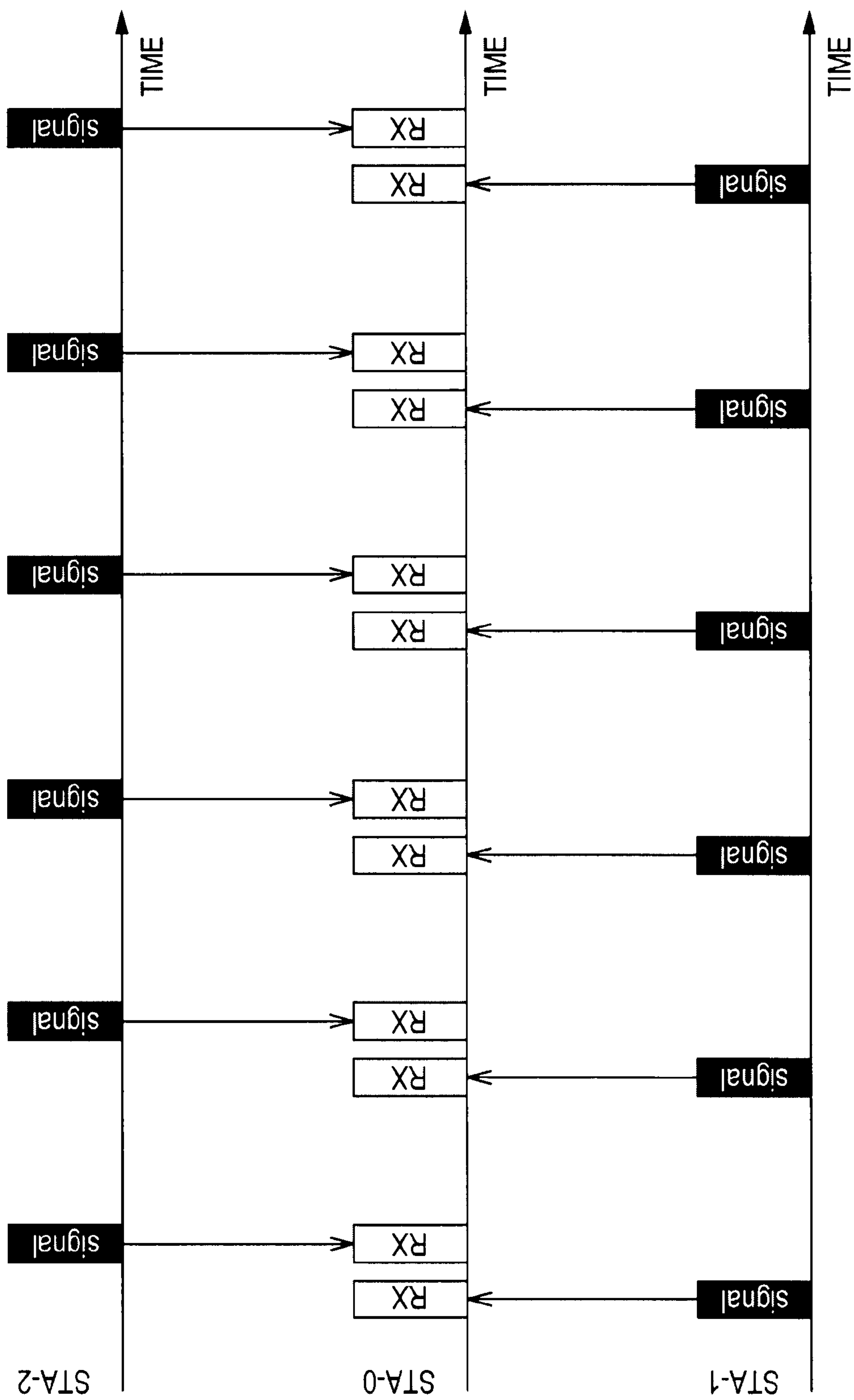
FIG. 25 is a diagram illustrating the way in which terminal stations STA-1 and STA-2 each periodically transmit a signal signal to the STA-0, to update the beam pattern.

Also, FIG. 24 exemplifies a communication environment where STA-0 serving as the base station forms each of Beam-01 and Beam-02 with high gain as to STA-1 and STA-2 which are the communication parties, while STA-1 and STA-2 serving as terminal stations perform transmission/reception with the STA-0 with nondirectional beam patterns Beam-1 and Beam-2. By the base station STA-0 along transmitting with beam patterns Beam-1 and Beam-2 focused on the communication parties in this way, the reception SINR is improved as compared to the example shown in FIG. 22. Accordingly, at the time of the frame transmitting originator using a beam pattern focused on the communication partner, transmission overhead can be suppressed by using a preamble type having the Preamble-1 which is the shorter preamble.

Figure 9:
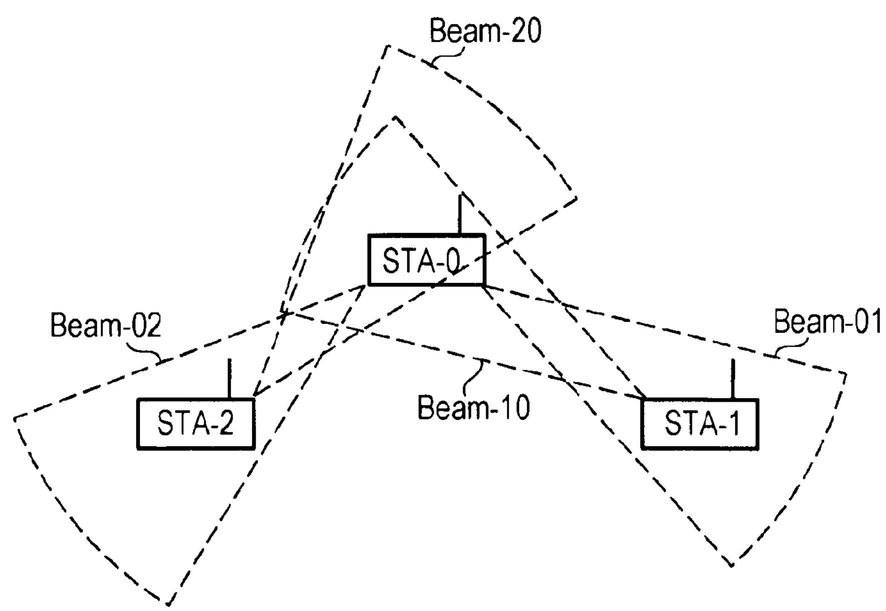
FIG. 9 is a diagram illustrating a communication environment wherein transmission/reception is performed forming beam patterns in which gain is increased mutually for communication parties one with another.

Also, FIG. 9 exemplifies a communication environment where STA-0 serving as the base station forms each of Beam-01 and Beam-02 with high gain as to STA-1 and STA-2 which are the communication parties and performs transmission/reception, and also STA-1 and STA-2 form each of Beam-10 and Beam-20 with high gain as to STA-0 and perform transmission/reception. In such a case, the reception SINR at the terminal stations STA-1 and STA-2 further improves. Accordingly, in a state where the frame transmission originator can recognize that the frame transmission destination is standing by with a beam pattern focused on itself, transmission overhead can be further suppressed by using a preamble type having Preamble-0 which is the shortest type, in the event of performing transmission using a beam pattern focused on the communication party as well.

In the event of performing access control following CSMA/CA procedures, or further in the event of using RTS/CTS handshake in tandem, the communication device 100 estimates the current communication state based on the immediately-prior transmission/reception history (last communication point-in-time as to the frame transmission destination, and the beam pattern and preamble time used therein), whereby the beam pattern and preamble type to be used for frame transmission this time can be decided.

Figures 10, 11:
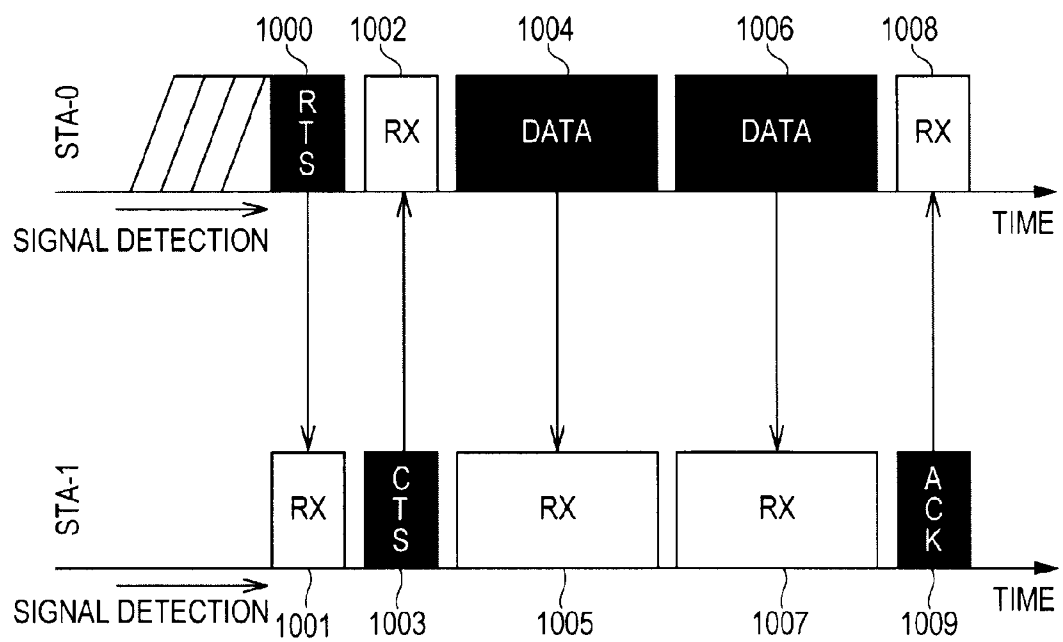
FIG. 10 is a diagram illustrating a communication sequence example where access control is performed between two communication stations STA-0 and STA-1 following CSMA/CA procedures.
FIG. 11 is a diagram illustrating a format example of transmission/reception history.

FIG. 10 illustrates a communication sequence example where access control is performed between the two communication stations STA-0 and STA-1 following CSMA/CA procedures. In the example in the drawing, RTS/CTS handshake is used in tandem. Operations of the communication stations performing suitable beam pattern control while performing access control based on signal detection will be described with reference to this drawing. Note that the communication stations STA-0 and STA-1 are configured the same as the communication device 100 shown in FIG. 2.

The STA-0 first monitors the media state for a predetermined frame interval DIFS to obtain a transmission opportunity, and in the event that a transmission signal does not exist during this period, further performs random backoff. Thus, the STA-0 confirms that there is no transmission from another communication station, and then transmits an RTS frame (1000) addressed to the adjacent STA-1.

At this point, the STA-0 does not have a transmission/reception history regarding the STA-1 (or a considerable amount of time ha elapsed from the last communication point-in-time and the transmission/reception history held thereby is not valid), i.e., does not have prior information on what sort of beam pattern would be suitable for performing transmission to the STA-1. Accordingly, at the time of transmission of the RTS frame (1000), transmission is performed with a nondirectional beam pattern such as Beam-0 in FIG. 22. Also, signals regarding which a beam pattern has not been formed in this way can be expected to be received at a low SINR value at the STA-1 which is the transmission destination. Accordingly, the STA-0 transmits the TRS frame (1000) using the preamble type having Preamble-2 which is the long preamble, so that signal detection can be performed at the STA-1 side.

The STA-1 is in a state of not knowing which adjacent station signals will be transmitted from at the point that the RTS frame (1000) arrives. Accordingly, the STA-1 performs signal detection with a nondirectional beam pattern like the Beam-1 in FIG. 22. On the other hand, as described above the RTS frame (1000) uses a preamble type having the Preamble-2 which is a long preamble, so signal detection can be made even with low SINR. The STA-1 has received the RTS frame (1001) from the STA-0, and accordingly generates a particular beam pattern addressed from STA-1 to STA-0 based on the information of this received signal. This beam pattern is a pattern focused on the STA-0 such as the Beam-10 in FIG. 9.

Upon decoding the received RTS frame (1001) and parsing the contents described therein, the STA-1 returns a CTS frame (1003) addressed to the STA-0. At this time, the STA-1 performs transmission using the beam pattern Beam-10 generated at the time of reception (1001) of the RTS frame (1000) earlier. The CTS frame (1003) regarding which a beam pattern is generated and is transmitted can be assumed to have improved SINR at the time of reception at the STA-0. Accordingly, based on this assumption, the STA-1 may transmit the CTS frame (1003) using a preamble type having Preamble-1 which is a somewhat shorter preamble. Alternatively, the STA-1 may transmit the CTS frame (1003) with the same preamble type used for the received RTS frame (1000). In any case, following having returned the CTS frame (1003), the STA-1 performs signal detection processing with a beam pattern focused on the STA-0 such as the Beam-10 in FIG. 9, anticipating that a data frame will be transmitted from the STA-0.

After returning the RTS frame (1000), the STA-0 performs signal detection processing anticipating that the STA-1 will transmit a CTS frame. The STA-0 is in a state of not knowing which beam pattern should be used as to the STA-1 at the point that the CTS frame arrives. Accordingly, the STA-0 performs signal detection with a nondirectional beam pattern like the Beam-0 in FIG. 22.

Upon receiving a CTS frame (1002) from the STA-1, the STA-0 can generate a particular beam pattern addressed form the STA-0 to the STA-1 based on this reception signal information. This beam pattern will be a pattern focused on the STA-1 as with the Beam-01 in FIG. 9.

The STA-0 then transmits a data frame (1004) in response to having received the CTS frame (1002). This data frame (1004) is transmitted using the beam pattern Beam-01 generated based on the CTS frame (1002) received earlier. Also, this data frame (1004) is transmitted with a beam pattern Beam-01 formed at the transmission originator STA-0, and is received at the transmission destination STA-1 with a beam pattern Beam-10 formed as described above. That is to say, transmission/reception is performed with both transmission/reception antennas having beams focused for a particular communication station as shown in FIG. 9, and since it can be assumed that the reception SINR at the STA-1 will be high and detection will be easy, the STA-0 can transmit the data frame (1004) using a preamble type having the Preamble-0 which is the shortest preamble.

The STA-1 forms beam pattern Beam-10 and receives a data frame (1005). Subsequently, there may be cases where the STA-0 consecutively transmits a data frame (1006). The beam pattern used at this time is the same as with the time of transmitting the data frame (1004) immediately before. The reason is that since the transmission point-of-time is in close approximation, the channel state is almost unchanged.

In other words, if within a period where judgment is made that the beam pattern and preamble type used for transmitting the data frame (1004) the previous time is valid, the STA-0 does not need to update the beam pattern again throughout the RTS/CTS handshake, so data frames (1006) can be transmitted using the same beam pattern as when transmitting the data frame (1004) immediately before without transmitting an RTS frame. Thus, transmission overhead can be suppressed by consecutively transmitting data frames while omitting the RTS/CTS handshake.

Also, a pilot symbol is inserted at predetermined intervals in the payload of the frames, for channel estimation and waveform equalization (widely known). Now, at the time of the STA-0 consecutively transmitting subsequent data frames (1006) within a period where judgment is made that the beam pattern and preamble type used for transmitting the data frame (1004) the previous time is valid, information transmission efficiency can be improved by reducing the rate of the pilot symbol to be inserted into the payload, or stopping insertion of the pilot symbol and consecutively transmitting data frames. Note that a control method of the rate of the pilot symbol to be inserted into the payload is disclosed in Japanese Unexamined Patent Application Publication No. 2001-77788 and Japanese Unexamined Patent Application Publication No. 2001-77789 which have already been transferred to the Present Assignee.

Subsequently, upon detecting that reception of a data frame (1007) has been completed, the STA-0 returns an ACK frame (1009) to the STA-0. This ACK frame (1009) is transmitted with a beam pattern Beam-10 formed at the transmitting originator STA-1, and is received with a beam pattern Beam-01 formed at the transmission destination STA-0. That is to say, transmission/reception is performed for both transmission/reception antennas in the same way of being in a state with the beam focused for a particular communication station, and since it can be assumed that the reception SINR at the STA-0 will be high and detection of signals easy, the STA-1 can transmit the ACK frame (1009) using a preamble type having the Preamble-0 which is the shortest preamble.

As with the case of performing access control following CSMA/CA procedures between STA-0 and STA-1 using RTS/CTS handshake in tandem, in the event of performing frame transmission/reception of frames to mutual communication parties following predetermined communication procedures, a beam pattern to be used can be secured based on the communication procedures, and further a suitable preamble type (preamble length) can be selected taking reception SINR and transmission overhead into consideration.

The communication device 100 operating as the STA-0 and STA-1 holds transmission/reception history obtained at the time of having performed frame transmission/reception following a MAC layer protocol and so forth, including CSMA/CA procedures, in the storage unit 150. The transmission/reception history as used here is to include at least information for identifying a beam pattern used at the time of frame transmission/reception the last time, the preamble type (preamble length) used at the time of frame transmission/reception the last time, point-in-time information at which frame transmission/reception was performed the last time, and a threshold for elapsed time, for each communication party. The storage unit 150 stores a transmission/reception history record such as shown in FIG. 11 for each communication party.

The communication device 100 can refer such transmission/reception history to decide the beam pattern to be used the next time performing frame transmission/reception with the same communication party, and selection of the preamble type of transmission frames.

Also, the beam pattern and preamble type used at the time of frame transmission/reception the last time is valid as long as there is no change in channel with the communication party. Generally, channels do change over time, so the communication device 100 can judge the validity of the beam pattern and preamble type (preamble length) held as transmission/reception history, based on the elapsed time from the last time of transmission/reception with the same communication party. A transmission/reception history regarding which the elapsed time threshold has been exceeded is invalid, and so even if frame transmission/reception is to be performed with the same communication party, the stored beam pattern and preamble type cannot be used (meaningless data). Also, the threshold for elapsed time is not uniform, and the threshold for elapsed time should be set smaller for a communication party regarding which channel change readily occurs, such as one which frequently moves.

Now, the processing procedures for the communication device 100 setting a suitable beam pattern and preamble type based on past transmission/reception history will be described in detail, with reference to communication sequence examples shown in FIG. 12 and FIG. 13. Note that the communication stations STA-0 and STA-1 are configured the same as the communication device 100 shown in FIG. 2.

Figure 12:
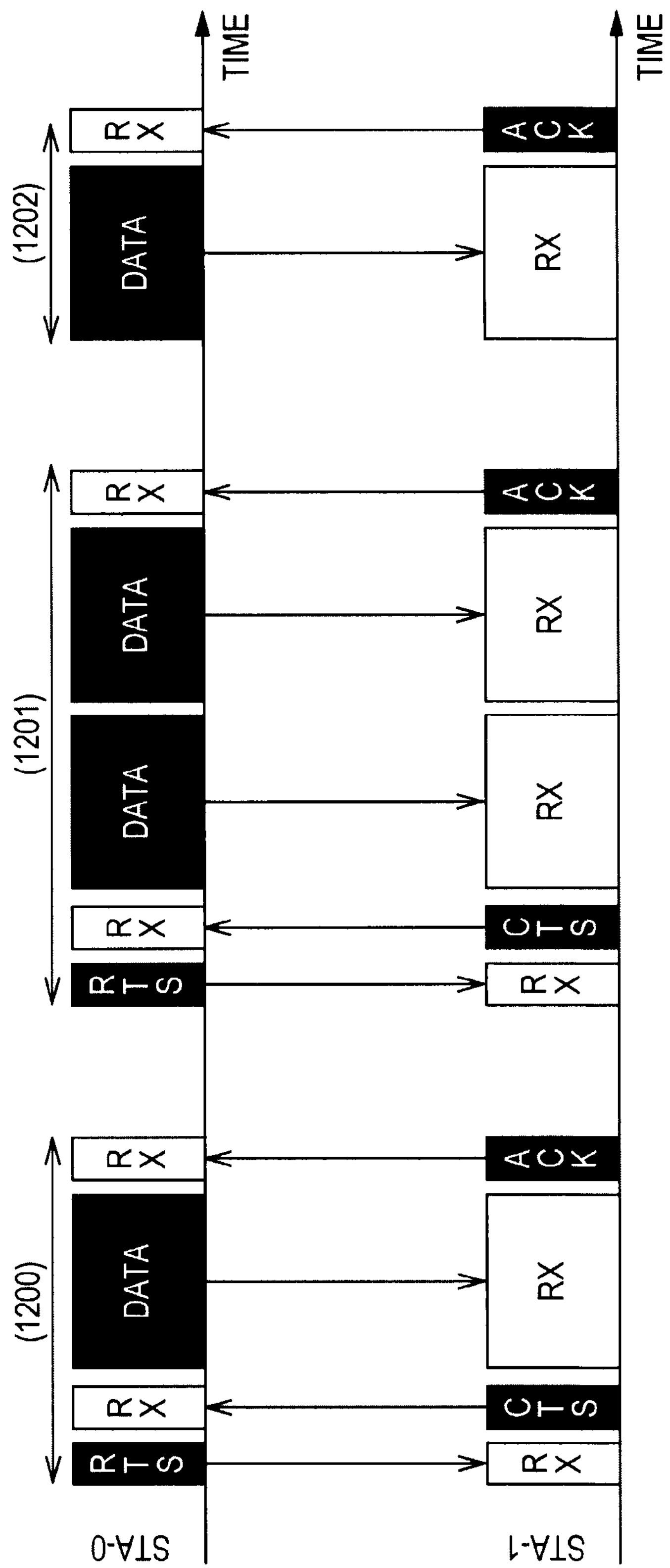
FIG. 12 is a communication sequence diagram for describing processing procedures for the communication device 100 to set a suitable beam pattern and preamble type based on past transmission/reception history.

In a section denoted by reference numeral 1200 in FIG. 12, transactions are performed between the STA-0 and STA-1 following CSMA/CA procedures using RTS/CTS handshake in tandem. The STA-0 and STA-1 secure a beam pattern to be used in the case of performing frame transmission to the communication party and in the case of performing frame reception from the communication party, and also select the preamble type of the transmission frame in accordance with the beam pattern to be used and so forth. The STA-0 and STA-1 then each save this information in their respective storage units 150 as transmission/reception history (see FIG. 11) along with the point-in-time information of the time of frame transmission/reception. Note that the method whereby the STA-0 and STA-1 each generate a bit pattern and select a preamble type within the transaction 1200 is as already described with reference to FIG. 10, and accordingly will be omitted here.

In the section denoted by reference numeral 1201, the STA-0 continues to transmit data to the STA-1, and transactions following CSMA/CA procedures using RTS/CTS handshake in tandem are repeatedly executed.

At this time, before transmission of an RTS frame, the STA-0 makes reference to the transmission/reception history within its own storage unit 150, checks the elapsed time after having performed frame transmission/reception with the STA-1 the last time (i.e., from the end of the transaction 1200), and determines whether or not the elapsed time threshold has been exceeded. In the example in the drawing, the next transaction 1201 is started within the elapsed time threshold from ending of the transaction 1200, so the transmission/reception history of the STA-1 is valid, and accordingly RTS frame transmission is attempted with the previously-used beam pattern. Also, the STA-0 performs transmission of an RTS frame using the preamble type having the Preamble-0 that was used for the data frame the last time, or using a preamble type having the Preamble-1 which is a somewhat longer preamble length than this.

Also, the STA-1 makes reference to the transmission/reception history within its own storage unit 150, and since the elapsed time from the last time that frame transmission/reception was made with the STA-1 (i.e., from the end of the transaction 1200) is within the threshold, performs signals detection with the beam pattern used the last time. The RST frame arriving from the STA-0 is of a preamble type having a short preamble length of Preamble-0 or Preamble-1, but since the reception SINR is improved by directing beam patterns toward each other, the STA-1 can successfully receive RTS frames. At this time, the STA-1 may be arranged to newly generate a beam pattern as to the STA-0 based on the reception signals, and update the transmission/reception history with the STA-0. Also, the STA-0 performs transmission of a CTS frame using the preamble type having the Preamble-0 that was used for the ACK frame the last time, or using a preamble type having the Preamble-1 which is a somewhat longer preamble length than this.

After returning the RTS frame, the STA-0 performs signal detection processing with the beam pattern used the last time, anticipating that a CTS frame will be transmitted from the STA-1. In response to having received the CTS, the STA-0 transmits a data frame addressed to the STA-1 using the preamble type having the Preamble-0 which has the shortest preamble length, with the beam pattern used the last time. An arrangement may be made wherein the STA-0 newly generates a beam pattern addressed to the STA-1 based on the reception signals of the CTS, and updates the transmission/reception history with the STA-1.

The STA-1 receives the data frame from the STA-0 by way of the beam pattern focused on the STA-0. An arrangement may be made wherein the STA-1 newly generates a beam pattern addressed to the STA-0 based on the reception signals, and updates the transmission/reception history with the STA-0.

There are cases wherein the STA-0 consecutively transmits two or more data frames, and the beam pattern and preamble type used at that time may be the same as that for the data frame transmitted immediately prior. As long as within the period judged that the beam pattern used at the time of the last data frame transmission is valid, the RTS/CTS handshake is omitted, and the STA-0 continuously transmits data frames using the same beam pattern (the same as above). By omitting the RTS/CTS handshake and consecutively transmitting data frames, the transmission overhead can be suppressed. Also, in the event of consecutively transmitting data frames, the STA-0 can improve information transmission efficiency by reducing the rate of the pilot symbol to be inserted into the payload, or stopping insertion of the pilot symbol and consecutively transmitting data frames, and consecutively transmitting data frames (the same as above).

In the same way, the STA-1 receives data frames with the beam pattern focused on the STA-0. An arrangement may be made wherein the STA-1 newly generates a beam pattern addressed to the STA-0 each time a data frame is received, and constantly updates the transmission/reception history with the STA-0.

Subsequently, upon having judged that data frame reception has been completed, the STA-1 returns an ACK frame in the beam pattern focused on the STA-0. This ACK frame may be one using the preamble type having the Preamble-0 which is the shortest preamble.

The STA-0 and STA-1 then update the transmission/reception history information such as the beam pattern secured through the throughout the transaction 1201 and the preamble type used and so forth, and hold in the respective storage units 150.

In the section denoted by reference numeral 1202 the STA-0 omits the RTS/CTS handshake, and suddenly transmits a data frame addressed to the STA-1. At this time, the STA-0 references the transmission/reception history within its own storage unit 150 and checks the time elapsed from the time of having performed frame transmission/reception the last time with the STA-1.

In the example in the drawing, this is within the elapsed time threshold, so the STA-0 forms the beam pattern used the last time, and data frame transmission is attempted using the preamble type having the Preamble-0, or using a preamble type having the Preamble-1 which is a somewhat longer preamble length than this.

In the same way, the STA-1 receives the data frame with the beam pattern focused on the STA-0. An arrangement may be made wherein the STA-1 newly generates a beam pattern addressed to the STA-0 upon the data frame being received, and updates the transmission/reception history with the STA-0.

Subsequently, upon having judged that data frame reception has been completed, the STA-1 returns an ACK frame in the beam pattern focused on the STA-0, using the preamble type having the Preamble-0 which is the shortest preamble.

The STA-0 and STA-1 then update the transmission/reception history information such as the beam pattern secured through the throughout the transaction 1201 and the preamble type used and so forth, and hold in the respective storage units 150.

Figure 13:
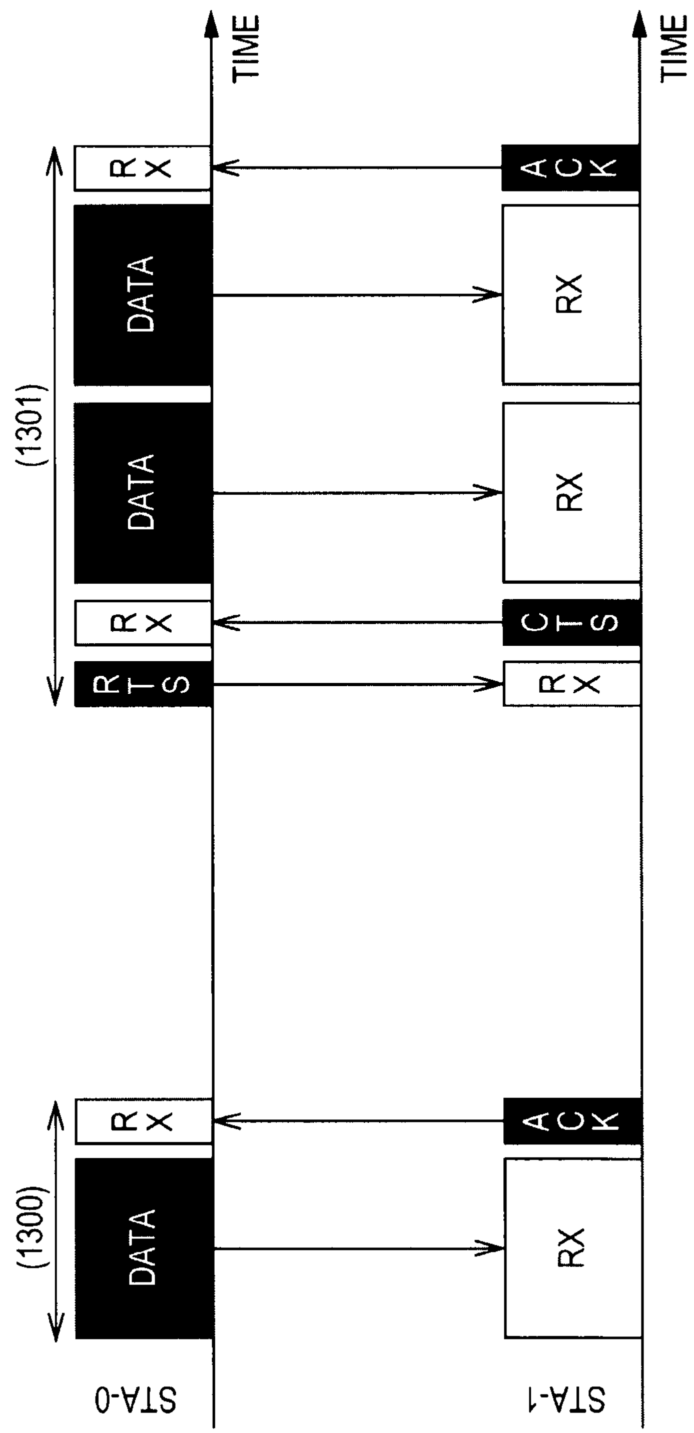
FIG. 13 is a communication sequence diagram for describing processing procedures for the communication device 100 to set a suitable beam pattern and preamble type based on past transmission/reception history.

Also, in the section denoted by reference numeral 1300 in FIG. 13, frame transmission/reception procedures are executed between the STA-0 and STA-1. At this time, the STA-0 and STA-1 secure a beam pattern to be used in the case of performing frame transmission to the communication party and in the case of performing frame reception from the communication party, and also select the preamble type of the transmission frame in accordance with the beam pattern to be used and so forth. The STA-0 and STA-1 then each save this information in their respective storage units 150 as transmission/reception history (see FIG. 11) along with the point-in-time information of the time of frame transmission/reception. Note that the media access control method applied in transaction 1300 is optional, and is not restricted to CSMA/CA and RTS/CTS.

Subsequently, in the section denoted by reference numeral 1301, the STA-0 continues to transmit data to the STA-1, and transactions following CSMA/CA procedures using RTS/CTS handshake in tandem are repeatedly executed.

At this time, before transmission of an RTS frame, the STA-0 makes reference to the transmission/reception history within its own storage unit 150, checks the elapsed time after having performed frame transmission/reception with the STA-1 the last time, and determines whether or not the elapsed time threshold has been exceeded. In the example in the drawing, the elapsed time threshold from ending of the transaction 1300 has elapsed, so the transmission/reception history of the STA-1 is invalid. Accordingly, an RTS frame is transmitted from the STA-0 with a nondirectional beam pattern such as the Beam-0 in FIG. 22. Also, signals regarding which a beam pattern has not been formed in this way can be assumed to be received at a low SINR value at the STA-1 which is the transmission destination. Accordingly, the STA-0 transmits an RTS frame using a preamble type having the Preamble-2 which is a long preamble, so as allow signals to be detected at the STA-1 side.

Also, the STA-1 makes reference to the transmission/reception history within its own storage unit 150, and since the elapsed time from the last time that frame transmission/reception was made with the STA-1 has exceeded the threshold, the transmission/reception history of the STA-0 is invalid. Accordingly, the STA-1 performs signal detection with a nondirectional beam pattern such as Beam-1 in FIG. 22. On the other hand, since an RTS frame uses a preamble type having the Preamble-2 which is a long preamble as described above, signal detection can be made even with low SINR.

Thereafter, the STA-0 and STA-1 can secure a beam pattern to be used in the case of performing frame transmission to the communication party and in the case of performing frame reception from the communication party, and also select a suitable preamble type to be used for transmission frames. Note however, that as long as within the period judged that the beam pattern used at the time of the last data frame transmission is valid, the RTS/CTS handshake is omitted, and the STA-0 continuously transmits data frames using the same beam pattern (the same as above). By omitting the RTS/CTS handshake and consecutively transmitting data frames, the transmission overhead can be suppressed. The STA-0 and STA-1 continuously update the transmission/reception history and save in the respective storage units 150. Also, in the event of consecutively transmitting data frames, the STA-0 can improve information transmission efficiency by reducing the rate of the pilot symbol to be inserted into the payload, or stopping insertion of the pilot symbol and consecutively transmitting data frames, and consecutively transmitting data frames (the same as above).

Figure 14:
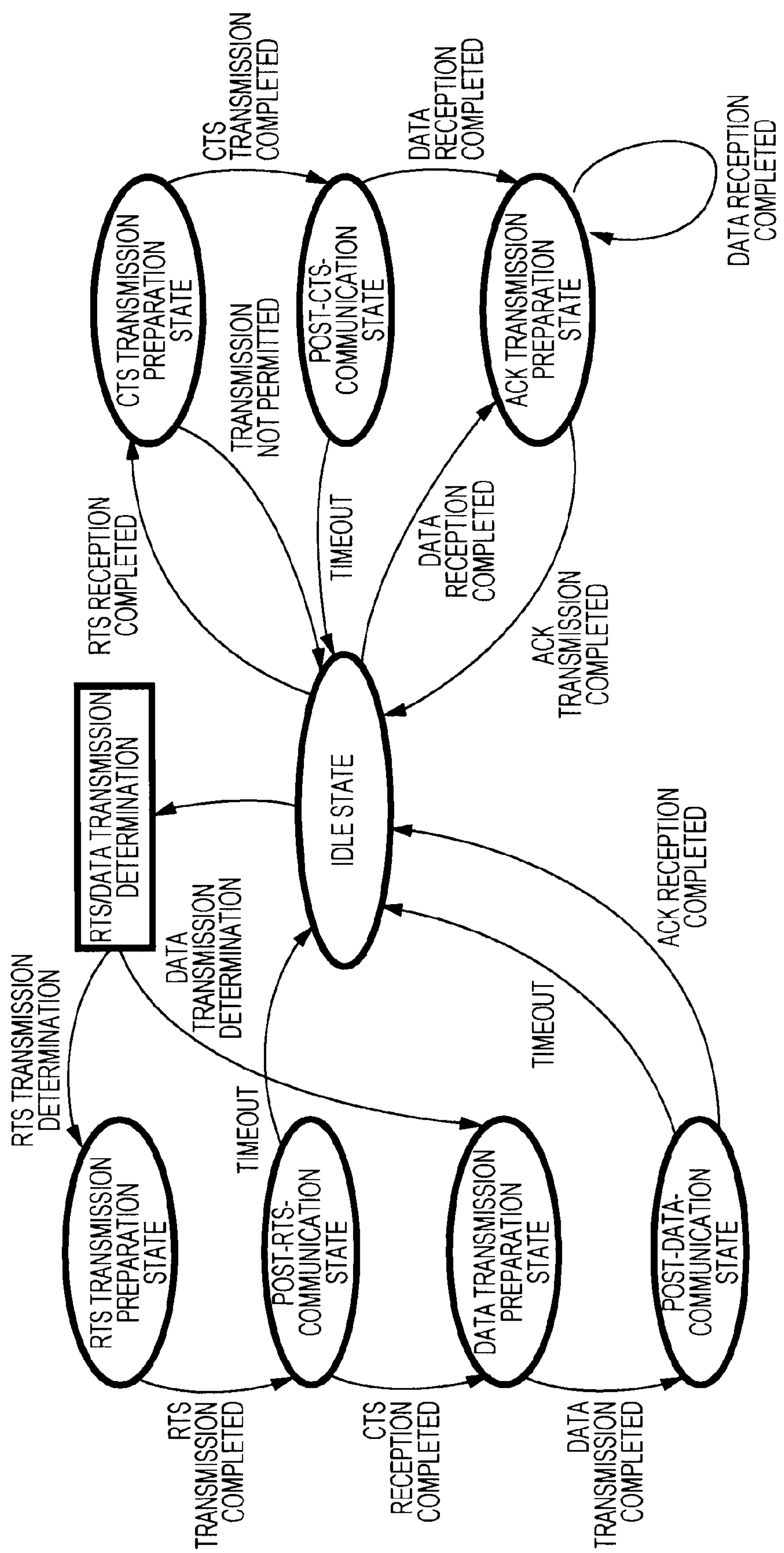
FIG. 14 is a state transition diagram illustrating the communication device 100 operating as the communication station STA-0 in the communication sequence shown in FIG. 10, FIG. 12, and FIG. 13.

FIG. 14 illustrates a state transition diagram at the time of the communication device 100 operating as the communication stations STA-0 and STA-1 in the communication sequence shown in FIG. 10, FIG. 12, and FIG. 13.

We will say that the communication device 100 is standing by in an idle state. At this time, in the event that a data transmission request occurs from a higher layer from the communication protocol, judgment is made regarding whether to use RTS/CTS handshake in tandem, or to not use RTS/CTS handshake in tandem but to start data frame transmission following performing a random backoff. Note however, the reference on whether or not to use RTS/CTS handshake in tandem is not directly related to the essence of the present invention, so description thereof will be omitted here.

In the event that judgment is made to use RTS/CTS handshake in tandem, the communication device 100 makes transition to the RTS frame transmission preparation state, and in the event that judgment is made not to use RTS/CTS handshake in tandem, transition is made to the data frame transmission preparation state. Either state is an event which will activate a later-described transmission/reception history updating processing routine (see FIG. 15).

In the RTS frame transmission preparation state, the communication device 100 determines the beam pattern and preamble type to be used, via later-described transmission/reception history updating processing (see FIG. 15). The communication device 100 then monitors the media state for a predetermined frame interval DIFS to obtain a transmission opportunity, and in the event that a transmission signal does not exist during this period, further performs random backoff and then transmits an RTS frame addressed to the communication party using the decided beam pattern and preamble type.

In the post RTS frame transmission state, the communication device 100 stands by to receive a CTS frame returned from the communication party using the beam pattern decided at the time of RTS frame transmission preparation, by a predetermined frame interval SIFS (Short IFS) after completion of transmission of the RTS frame.

In the event that the communication device 100 has received a CTS frame addressed to itself from the communication party within the frame interval SIFS after completing transmission of the RTS frame, the communication device 100 transitions to the data frame transmission preparation state. Now, completion of reception of the CTS frame is an event which will activate a later-described transmission/reception history updating processing routine (see FIG. 16), and this processing routine is executed and then returns to the data transmission preparation state.

In the event that the communication device 100 has not received a CTS frame addressed to itself from the communication party within the frame interval SIFS after completing transmission of the RTS frame, and times out, the communication device 100 aborts transmission of the subsequent data frames, and transitions to an idle state. Note that a CTS frame reception timeout is an event which will activate a transmission/reception history updating processing routine (see FIG. 19).

In the data frame transmission preparation state, the communication device 100 determines the beam pattern and preamble type to be used, via later-described transmission/reception history updating processing (see FIG. 15). The communication device 100 then transmits a data frame to the communication party using the decided beam pattern and preamble type, following a predetermined frame interval SIFS elapsing after reception of the CTS frame addressed to itself has been completed.

In the post data frame transmission state, the communication device 100 stands by to receive an ACK frame returned from the communication party using the beam pattern decided at the time of data frame transmission preparation, by a predetermined frame interval SIFS after completion of transmission of the data frame.

In the event that the communication device 100 has received an ACK frame addressed to itself from the communication party within the frame interval SIFS after completing transmission of the data frame, the communication device 100 returns to the idle state. Note that completion of reception of the ACK frame is an event which will activate a later-described transmission/reception history updating processing routine (see FIG. 16), and this processing routine is executed and then returns to the idle state.

In the event that the communication device 100 has not received an ACK frame addressed to itself from the communication party within the frame interval SIFS after completing transmission of the RTS frame, and times out, the communication device 100 transitions to an idle state. Note that a CTS frame reception timeout is an event which will activate a transmission/reception history updating processing routine described later (see FIG. 19), and this processing routine is executed and then returns to the idle state.

Also, the communication device 100 stands by for reception in the idle state. At this time, the communication device 100 can use a nondirectional beam pattern, or use the (still valid) beam pattern used at the time of the last transmission/reception operation.

AT the time of the communication device 100 receiving an RTS frame addressed to itself in an idle state, this is an event which will activate a transmission/reception history updating processing routine described later (see FIG. 16), and this processing routine is executed and then transition is made to a CTS transmission preparation state.

A CTS transmission preparation state is an event which will activate a later-described transmission/reception history updating processing routine (see FIG. 15), and the communication device 100 determines the beam pattern and preamble type to be used, via the processing routine. The communication device 100 then transmits a CTS frame to the RTS frame transmission originator using the decided beam pattern and preamble type, following a predetermined frame interval SIFS elapsing after reception of the CTS frame addressed to itself has been completed.

Alternatively, in the event that data frame transmission is not permitted even in the event that an RTS frame addressed to itself is received, the communication device 100 returns to the idle state without replying the CTS frame to the transmission originator of the RTS frame within the predetermined frame interval SIFS. The cause of not permitting transmission of a data frame is not directly related to the essence of the present invention, so description thereof will be omitted here.

In the post CTS transmission state, the communication device 100 stands by for reception of a data frame transmitted from the communication party using the beam pattern decided in CTS frame transmission preparation, by a predetermined frame interval SIFS from having completed transmission of the CTS frame.

In the event that the communication device 100 has received a data frame addressed to itself from the communication party within the frame interval SIFS after completing transmission of the CTS frame, the communication device 100 transitions to the ACK frame transmission preparation state. Note that completion of reception of the data frame is an event which will activate a later-described transmission/reception history updating processing routine (see FIG. 16), and this processing routine is executed and then returns to the ACK frame transmission preparation state.

In the event that the communication device 100 has not received a data frame addressed to itself from the communication party within the frame interval SIFS after completing transmission of the CTS frame, and times out, the communication device 100 aborts reception of subsequent data frames, and transitions to an idle state. Note that a data frame reception timeout is an event which will activate a transmission/reception history updating processing routine (see FIG. 19).

Also, in the event that the communication device 100 has received a data frame addressed to itself in an idle state (without going through RTS/CTS handshake), the communication device 100 transitions to the ACK frame transmission preparation state. Note that completion of reception of the data frame is an event which will activate a later-described transmission/reception history updating processing routine (see FIG. 16), in the same way as with the case of using RTS/CTS handshake, and this processing routine is executed and then returns to the ACK frame transmission preparation state.

In the ACK frame transmission preparation state, the beam pattern and preamble type to be used are decided via the later-described transmission/reception history updating processing (see FIG. 15). The communication device 100 then transmits an ACK frame to the communication party which is the data frame transmission originator using the decided beam pattern and preamble type, following a predetermined frame interval SIFS elapsing after reception of the data frame addressed to itself has been completed.

Alternatively, in the event of the communication device 100 further receiving a data frame addressed to itself in the ACK frame transmission preparation state, completion of reception thereof is an event which will activate a later-described transmission/reception history updating processing routine (see FIG. 16), and this processing routine is executed and then returns to the ACK frame transmission preparation state.

As described earlier, the communication devices 100 secure transmission/reception history for each communication party through the communication sequences shown in FIG. 10, FIG. 12, and FIG. 13, for example, and can manage these in the storage units 150 of each. This transmission/reception history is of a data structure such as shown in FIG. 11, for example. The communication device 100 updates the contents of the record of the transmission/reception history within the storage unit 150 each time frame transmission/reception is performed with the same communication party. The following is description of processing procedures for the communication device 100 updating the transmission/reception history as to a communication party at the time of performing frame transmission/reception processing following the state transition diagram shown in FIG. 14.

Figure 15:
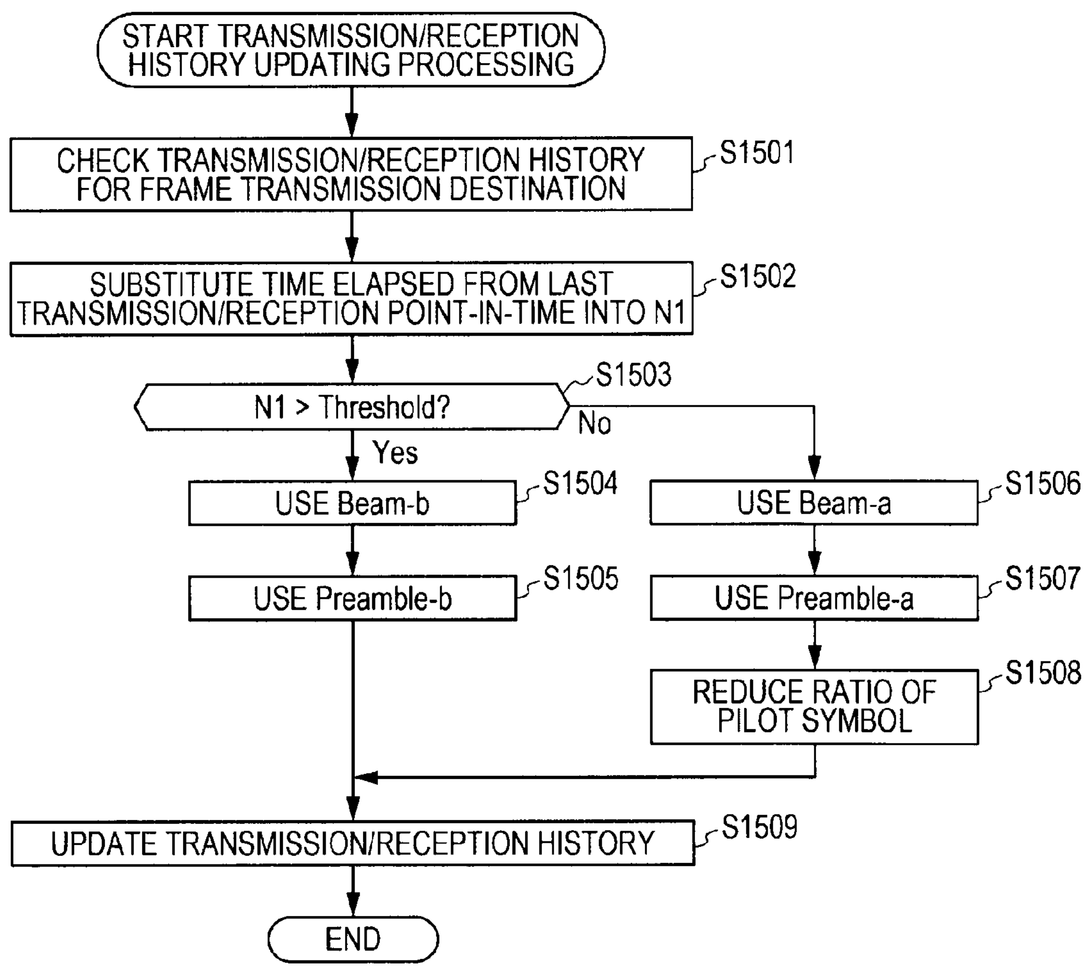
FIG. 15 is a flowchart illustrating processing procedures for updating transmission/reception history, which is successively performed, with transition of the communication device 100 to a state of preparation to transmit the frames of RTS, CTS, data, and ACK, as a startup event.

FIG. 15 illustrates, in a flowchart format, processing procedures for updating transmission/reception history, which is continuously executed with the communication device 100 transitioning to a transmission preparation state of the RTS, CTS, data, and ACK frames, as a startup event. The processing procedures can be realized in the form of the control unit 190 within the wireless communication unit 170 executing predetermined program code.

The communication device 100 references the transmission/reception history of the frame transmission destination held in the storage unit 150 (step S1501), calculates the elapsed time from the last transmission/reception point-in-time with this frame transmission destination, and substitutes this into a variable N1 (step S1502). Whether or not the elapsed time N1 exceeds the threshold (Threshold) of elapsed time recorded in this transmission/reception history is then checked (step S1503).

Now, in the event that the elapsed time from the last transmission/reception point-in-time exceeds the threshold (Yes in step S1503), the transmission/reception history of the frame transmission destination that is held in the storage unit 150 can be estimated to be too old and accordingly invalid information. Accordingly, the communication device 100 uses beam pattern Beam-b and preamble type Preamble-b (steps S1504, S1505). Specifically, beam pattern Beam-b is a beam pattern which is nondirectional or which is gradual in accordance with passage of time. Also, the preamble type Preamble-b changes to a preamble type which is longer in preamble length than the last time, or the longest. That is to say, steps S1504 and S1505 are equivalent to updating each of the beam pattern and preamble type to be used for transmission of a frame this time.

On the other hand, in the event that the elapsed time from the last transmission/reception point-in-time does not exceed the threshold (No in step S1503), the transmission/reception history of the frame transmission destination that is held in the storage unit 150 can be estimated to be still valid. Accordingly, the communication device 100 uses beam pattern Beam-a and preamble type Preamble-a held as the transmission/reception history, without change (steps S1506, S1507).

Also, in the event that judgment can be made that the transmission/reception history of the frame transmission destination is still valid, this is equivalent to no change in channel, so the communication device 100 reduces the rate of pilot symbols inserted into the payload of the frame for channel estimation (step S1508). Information transmission efficiency can be improved by reducing the rate of the pilot symbol to be inserted into the payload, or stopping insertion of the pilot symbol and consecutively transmitting data frames (the same as above).

The communication device 100 then updates the transmission/reception history relating to this frame transmission destination to the beam pattern and preamble type used for frame transmission this time, and the point-in-time of transmission/reception (step S1509).

Figure 16:
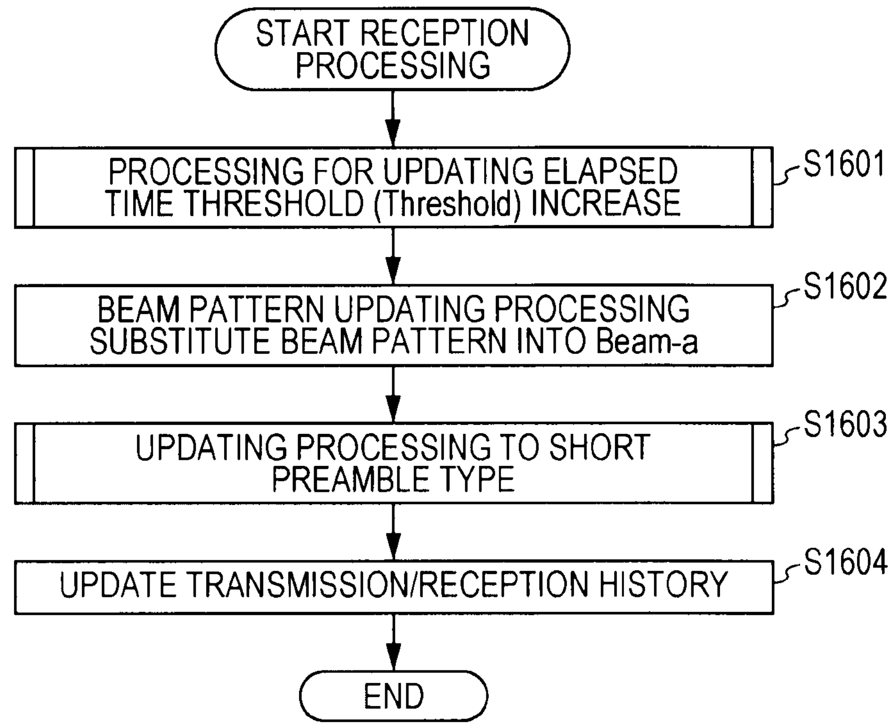
FIG. 16 is a flowchart illustrating processing procedures for updating transmission/reception history, which is successively performed, with completion of reception by the communication device 100 of the frames of RTS, CTS, data, and ACK, as a startup event.

FIG. 16 illustrates, in a flowchart format, processing procedures for updating transmission/reception history, which is continuously executed with the communication device 100 transitioning to a transmission preparation state of the RTS, CTS, data, and ACK frames, as a startup event. The processing procedures can be realized in the form of the control unit 190 within the wireless communication unit 170 executing predetermined program code.

First, the communication device 100 executes processing for updating elapsed time threshold (Threshold) increase, which is defined elsewhere (step S1601).

Next, the communication device 100 updates the beam pattern directed to the frame transmission originator via the frame reception processing, and substitutes the new beam pattern into Beam-a (step S1602).

Also, upon change being made to a more optimal beam pattern toward the frame transmission originator through having succeeded in frame reception, it can be expected that the reception SINR at the time of communication with this frame transmission originator from the next time on. If the reception SINR is high, signal detection can be made even with a shorter preamble length. Accordingly, the communication device 100 suppresses transmission overhead by executing changing processing to a preamble type with a shorter preamble length which is defined elsewhere (step S1603).

The communication device 100 then updates the transmission/reception history relating to this frame transmission destination to the beam pattern and preamble type used for frame transmission this time, and the point-in-time of transmission/reception (step S1604).

Figure 17:
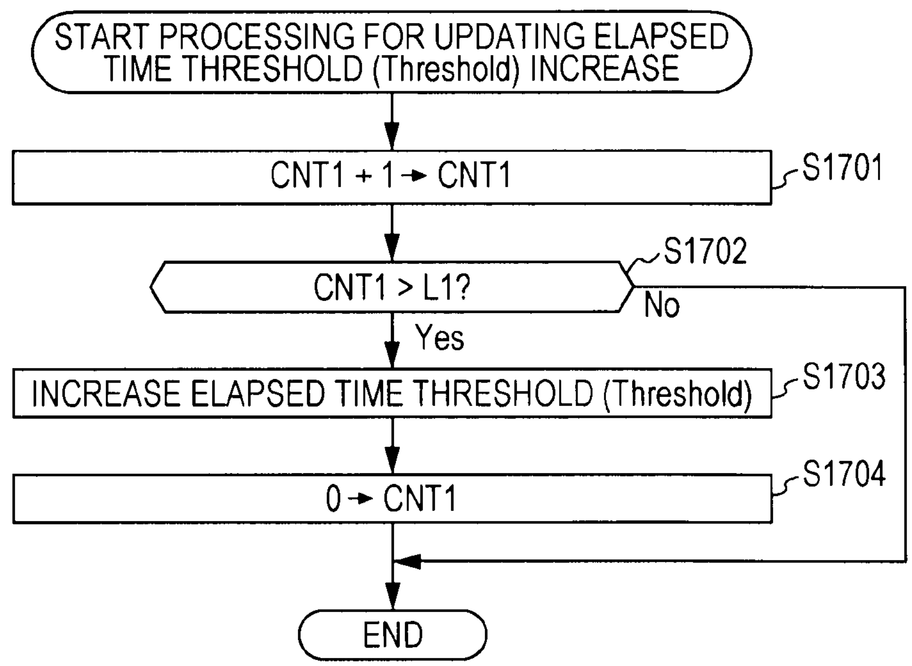
FIG. 17 is a flowchart illustrating processing procedures for updating to increase the threshold (Threshold) of elapse of time, executed in step S1601 in the flowchart shown in FIG. 16.

FIG. 17 illustrates, in a flowchart format, processing procedures for updating elapsed time threshold (Threshold) increase, which is executed in step S1601 in the flowchart shown in FIG. 16. The processing procedures can be realized in the form of the control unit 190 within the wireless communication unit 170 executing predetermined program code.

Each time this processing routine is entered, the communication device 100 increments a counter CNT1 by 1 each (step S1701).

In the event that the value of the counter CNT1 exceeds a predetermined value L1 (Yes in step S1702), this means that the number of times of successful completion of reception processing with this communication party has exceeded L1 after the elapsed time in the transmission/reception history was updated. In such a case, judgment can be made that the channel state with the communication party is good, and that the same transmission/reception history is valid over a long period, i.e., that the elapsed time threshold (Threshold) can be made longer.

Accordingly, the communication device 100 makes the elapsed time threshold (Threshold) longer (step S1703). Also, upon the elapsed time threshold (Threshold) being updated, the value of the counter CNT1 is returned to 0 (step S1704).

It can be judged that a communication party to which frames can be delivered properly has little change in channel state. Accordingly, the communication device 100 can allow the beam pattern to be valid over a long period, by increasing the elapsed time threshold following the processing procedures shown in FIG. 17.

Figure 18:
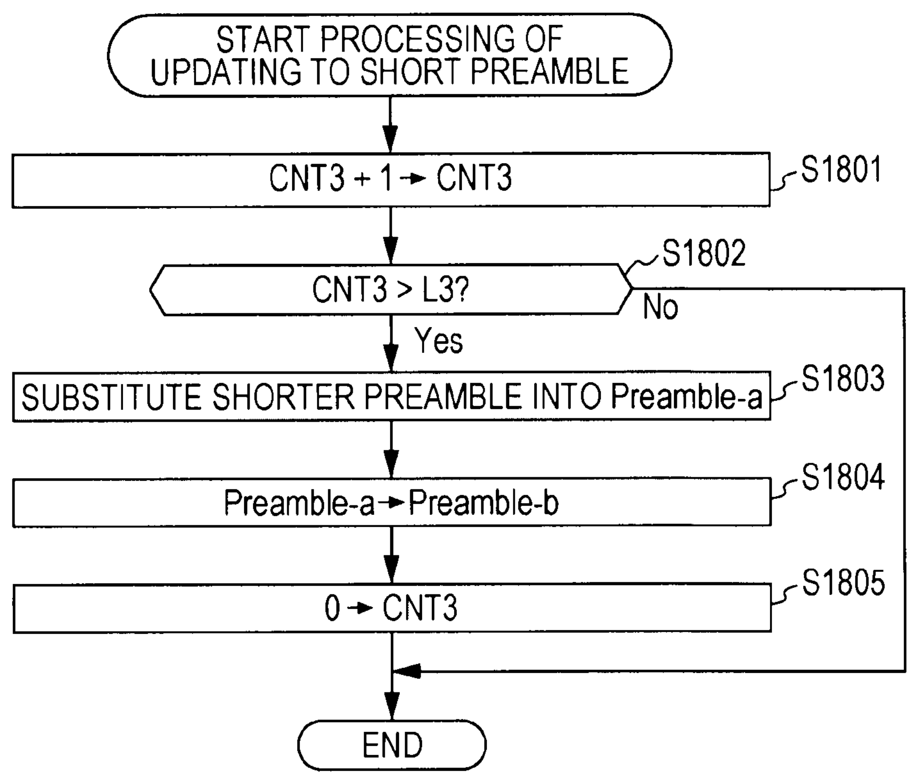
FIG. 18 is a flowchart illustrating processing procedures for to a preamble type with a shorter preamble length, executed in step S1603 in the flowchart shown in FIG. 16.

FIG. 18 illustrates, in a flowchart format, processing procedures for updating to a preamble type with shorter preamble length, which is executed in step S1603 in the flowchart shown in FIG. 16. The processing procedures can be realized in the form of the control unit 190 within the wireless communication unit 170 executing predetermined program code.

Each time this processing routine is entered, the communication device 100 increments a counter CNT3 by 1 each (step S1801).

In the event that the value of the counter CNT3 exceeds a predetermined value L3 (Yes in step S1802), this means that the number of times of successful completion of reception processing with this communication party has exceeded L3 after the elapsed time in the transmission/reception history was updated. In such a case, judgment can be made that the channel state with the communication party is good, and that the same transmission/reception history is valid over a long period, i.e., judgment can be made that that the reception SINR via this channel is high and that transmission overhand can be suppressed by changing to a preamble type with a shorter preamble length.

Accordingly, the communication device 100 changes to a preamble type with a shorter preamble length, substitutes into Preamble-a (step S1803), further substitutes Preamble-a into Preamble-b (step S1804), and then the value of the counter CNT3 is returned to 0 (step S1805).

Figure 19:
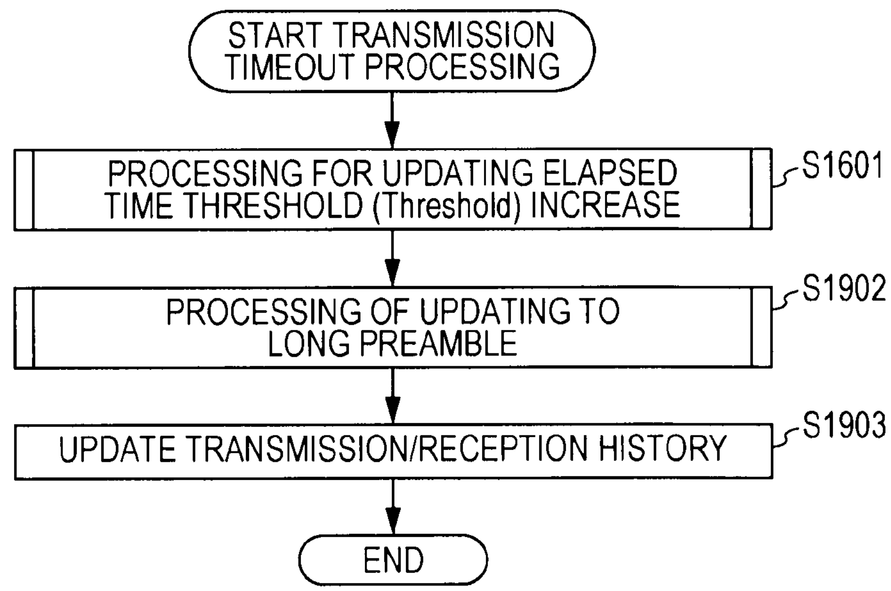
FIG. 19 is a flowchart illustrating processing procedures for updating transmission/reception history, which is successively performed, with the communication device 100 having timed out following transmission of the frames of RTS, CTS, data, and ACK, as a startup event.

FIG. 19 illustrates, in a flowchart format, processing procedures for updating transmission/reception history, which is continuously executed with the communication device 100 timing out following transmission of the RTS, CTS, data, and ACK frames, as a startup event. The processing procedures can be realized in the form of the control unit 190 within the wireless communication unit 170 executing predetermined program code.

First, the communication device 100 executes processing for updating elapsed time threshold (Threshold) increase, which is defined elsewhere (step S1901).

The fact that a transmission timeout has occurred can be estimated to mean that the channel state with the communication party is not good, and that reception SINR is low. In such a case, there is a need to switch to a preamble type with a longer preamble length while sacrificing transmission overhead, so that signal detection can be performed even with low reception SINR. Accordingly, the communication device 100 suppressed transmission overhead by executing processing of updating to a preamble type with a longer preamble length which is defined elsewhere (step S1902).

The communication device 100 then updates the transmission/reception history relating to this frame transmission originator to the beam pattern and preamble type used for frame transmission this time, and the transmission point-in-time (step S1903).

Figure 20:
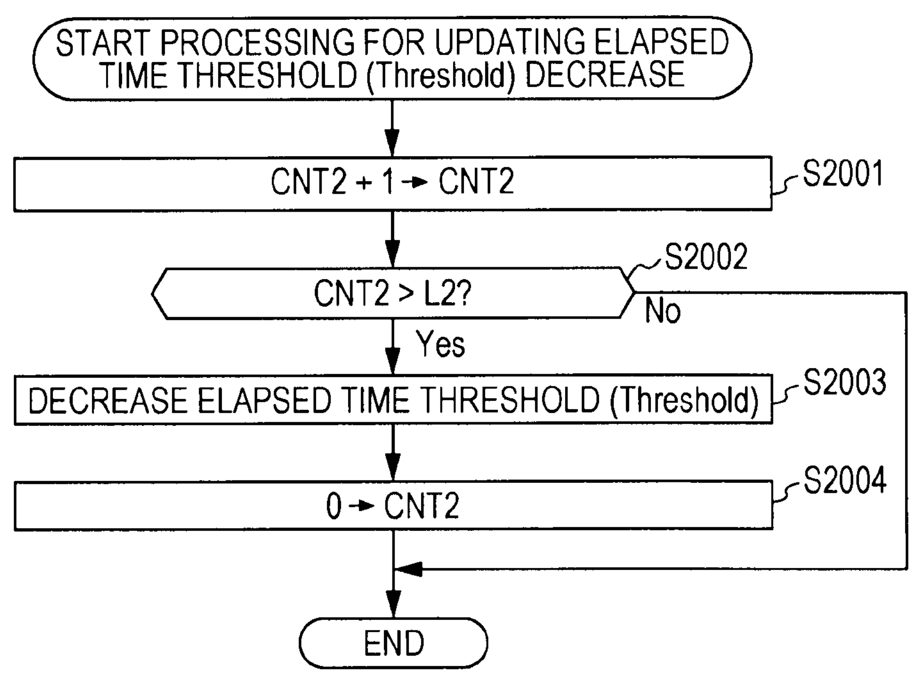
FIG. 20 is a flowchart illustrating processing procedures for updating to decrease the threshold (Threshold) of elapse of time, executed in step S1901 in the flowchart shown in FIG. 19.

FIG. 20 illustrates, in a flowchart format, processing procedures for updating elapsed time threshold (Threshold) reduction, which is executed in step S1901 in the flowchart shown in FIG. 19. The processing procedures can be realized in the form of the control unit 190 within the wireless communication unit 170 executing predetermined program code.

Each time this processing routine is entered, the communication device 100 increments a counter CNT2 by 1 each (step S2001).

In the event that the value of the counter CNT2 exceeds a predetermined value L2 (Yes in step S2002), this means that the number of times of timeout has exceeded L2 after the elapsed time in the transmission/reception history was updated. In such a case, judgment can be made that the channel state with the communication party is poor or change in channel state is marked, and that the same transmission/reception history becomes invalid in a short time, i.e., that the elapsed time threshold (Threshold) needs to be made shorter.

Accordingly, the communication device 100 makes the elapsed time threshold (Threshold) shorter (step S2003). Also, upon the elapsed time threshold (Threshold) being updated, the value of the counter CNT2 is returned to 0 (step S2004).

It can be judged that a communication party to which frames cannot be delivered properly has great change in channel state. Accordingly, the communication device 100 can suppress transmission error by updating beam pattern in a short time, by reducing the elapsed time threshold following the processing procedures shown in FIG. 20.

Figure 21:
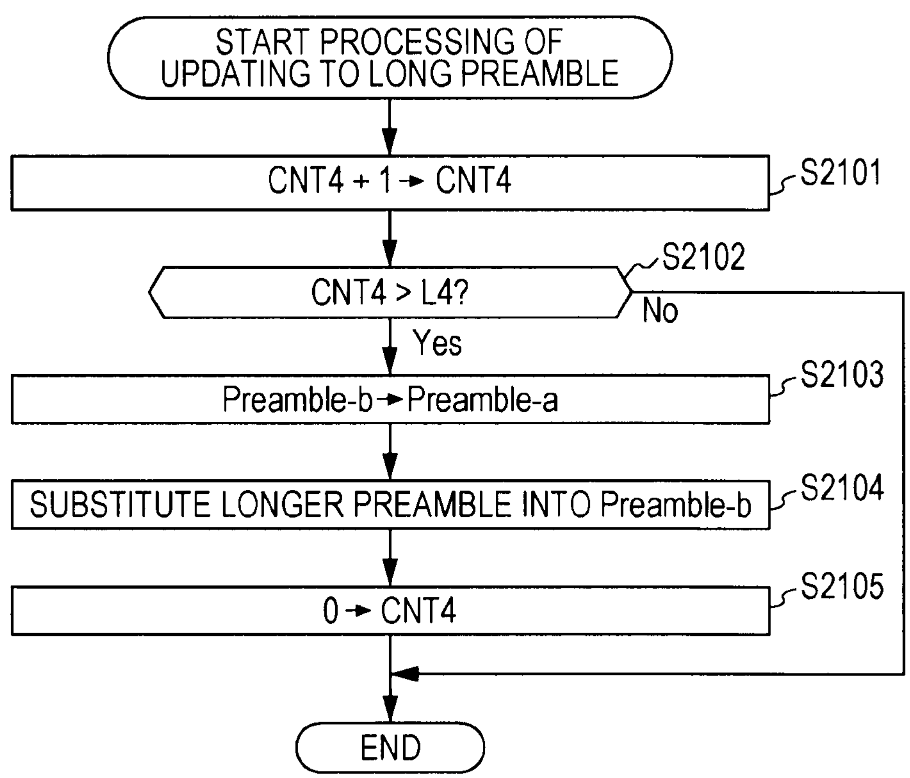
FIG. 21 is a flowchart illustrating processing procedures for updating to a preamble type with a longer preamble length, executed in step S1902 in the flowchart shown in FIG. 19.

FIG. 21 illustrates, in a flowchart format, processing procedures for updating to a preamble type with longer preamble length, which is executed in step S1902 in the flowchart shown in FIG. 19. The processing procedures can be realized in the form of the control unit 190 within the wireless communication unit 170 executing predetermined program code.

Each time this processing routine is entered, the communication device 100 increments a counter CNT4 by 1 each (step S2101).

In the event that the value of the counter CNT4 exceeds a predetermined value L4 (Yes in step S2102), this means that the number of times of transmission timeout with this communication party has exceeded L4 after the elapsed time in the transmission/reception history was updated. In such a case, judgment can be made that the channel state with the communication party is poor or change in channel state is marked, and that the same transmission/reception history becomes invalid in a short time. In such a case, there is a need to switch to a preamble type with a longer preamble length while sacrificing transmission overhead, so that signal detection can be performed even with low reception SINR.

Accordingly, the communication device 100 substitutes Preamble-b into Preamble-a (step S2103), then changes to a preamble type with a longer preamble length and substitutes this into Preamble-b (step S2104), and the value of the counter CNT4 is returned to 0 (step S2105).

Note however, that the CNT1 through CNT4 used in the flowcharts shown in FIGS. 17, 18, 20, and 21 are counters which are controlled so as to be executed just once in multiple times. Also, L1 through L4 are constants defining how many times "multiple times" are.

Note that with the communication system according to the present embodiment, the communication device 100 operating as an access point (AP) or terminal station (STA) may be, for example, a personal computer (PC), portable information terminal such as a cellular phone or PDA (Personal Digital Assistant), an information device such as a portable music player or game device, or a wireless communication module implemented in a television receiver or other home electronics device.

Figure 26:
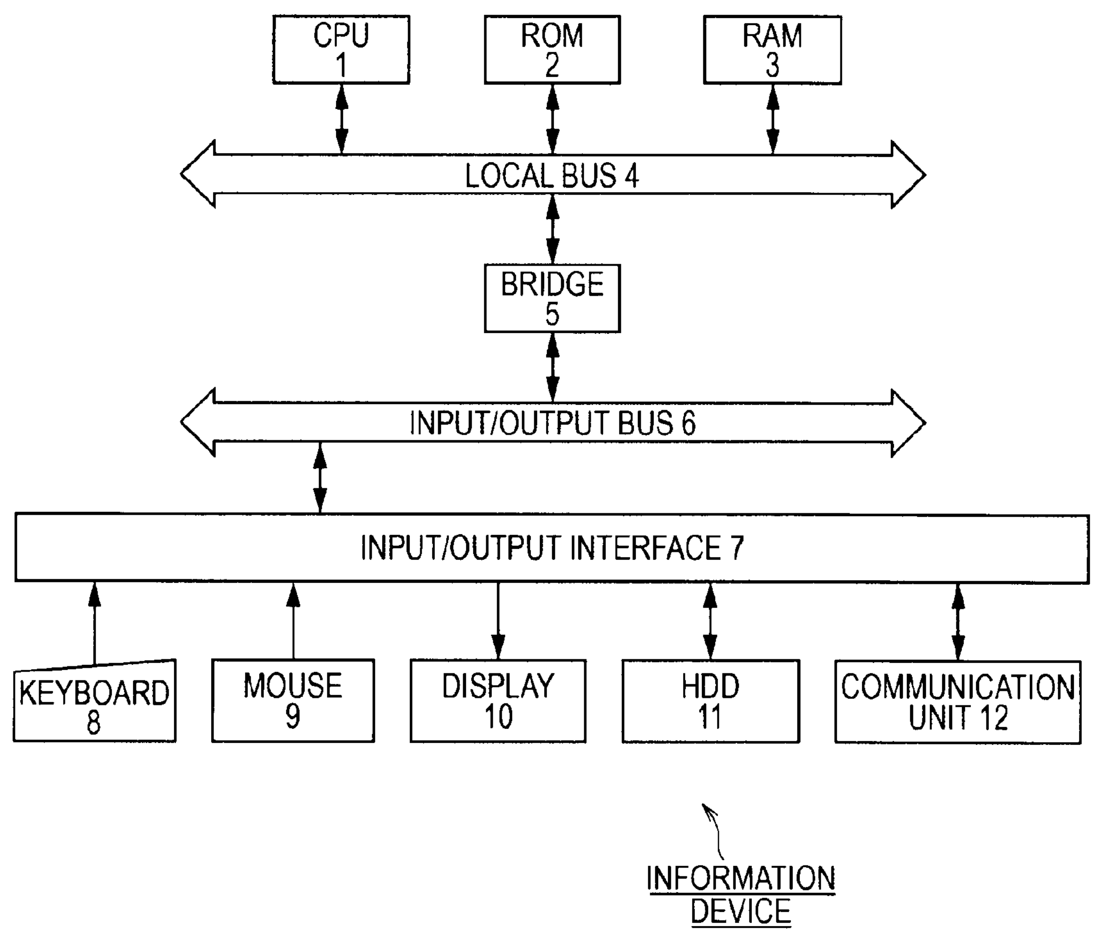
FIG. 26 is a diagram illustrating a configuration example of an information device in which a module communication device 100 has been implemented.

FIG. 26 illustrates a configuration example of an information device in which the communication device 100 which has been configured as a module has been implemented.

A CPU (Central Processing Unit) 1 executes a program stored in ROM (Read Only Memory) 2 or a hard disk drive (HDD) 11 under a program execution environment which an operating system (OS) provides. For example, synchronizing processing of received frames which will be described later, or a part of the processing thereof, can be realized in a form of the CPU 1 executing a predetermined program.

ROM 2 permanently stores program code such as POST (Power On Self Test) and BIOS (Basic Input Output System). RAM (Random Access Memory) 3 is used for loading programs stored in the ROM 2 and HDD (Hard Disk Drive) 11 at the time of execution by the CPU 1, or temporarily holding work data of a program being executed. These are mutually connected by a local bus 4 directly connected to a local pin of the CPU 1.

The local bus 4 is connected to an input/output bus 6 such as a PCI (Peripheral Component Interconnect) bus or the like via a bridge 5.

A keyboard 8 and a pointing device 9 such as a mouse or the like are input devices which the user operates. A display 10 is made up of an LCD (Liquid Crystal Display) or CRT (Cathode Ray Tube) or the like, and displays various types of information as text and images.

The HDD 11 is a drive unit with a hard disk serving as a recording medium built in, and drives the hard disk. The hard disk is used to install programs which the CPU 1 executes, such as the operating system and various types of application and so forth, and to save data files and the like.

A communication unit 12 is a wireless communication interface configured of the communication device 100 as a module, which operations as an access point or terminal station in an infrastructure mode, or operates in an ad-hoc mode, and executes communication with other communication terminals existing within the signal carry range. Operations of the communication device 100 are as already described.

INDUSTRIAL APPLICABILITY

The present invention has been described in detail so far, with reference to a particular embodiment. However, it is self-evident that one skilled in the art can make modifications and substitutions to the embodiment without departing from the essence of the present invention.

While the present invention can be suitably applied to communication systems employing millimeter waveband communication methods including IEEE 802.15.3c which uses the 60 GHz band, the essence of the present invention is not restricted to a particular frequency band. Also, the present invention can be applied to not only millimeter waveband communication but other directional communication as well.

Also, while description has been made with the present specification regarding an embodiment in which elapsed time is sued as a reference for judging the validity of beam patterns and preamble types held as transmission/reception history, and further increasing or reducing the threshold of elapsed time adaptively, the essence of the present invention is not restricted to this. For example, the validity of the beam patterns and preamble types (preamble lengths) used in the past can be judged using information relating to communication quality such as SINR or the like as well, and in other words, similar judgment can be made using information relating to communication quality as the threshold.

To summarize, the present invention has been disclosed in exemplary form, and the contents described in the present specification are not to be interpreted restrictively. The Claims should be referenced to determine the essence of the present invention.

REFERENCE SIGNS LIST

1 CPU
2 ROM
3 RAM
4 local bus
5 bridge
6 input/output bus
7 input/output interface
8 keyboard
9 pointing device (mouse)
10 display
11 HDD
12 communication unit
100 communication device
150 storage unit
160*a* through 160*n* multiple antennas
170 wireless communication unit
172 analog unit
174 AD conversion unit
176 DA conversion unit
180 digital unit
181 synchronizing unit
182 reception beam processing unit
183 electric power calculating unit
184 deciding unit
185 demodulation/decoding unit
186 encoding modulation unit
187 transmission beam processing unit
190 control unit
401 delay unit
402 complex conjugate unit
403 multiplier
404 averaging unit
405 determining unit
501 preamble holding unit
502 delay unit
503 totaling unit
504 peak detecting unit
601 frequency correcting unit
602 squaring device

The invention claimed is:

1. A communication device, comprising:

an antenna configured to form different beam patterns; and circuitry configured to:

control frame transmission/reception procedures, control a beam pattern from said different beam patterns of said antenna following said frame transmission/reception procedures, select, at the time of frame transmission, a first preamble type having a first determined preamble length from multiple types of preamble types when said circuitry controls said beam pattern to focus on a frame transmission destination for said frame transmission, select said beam pattern focused on said frame transmission destination from said different beam patterns of said antenna for transmission/reception, wherein a second preamble type from said multiple types of preamble types having a second determined longer preamble length is selected for said frame transmission when another beam pattern not controlled by said circuitry is selected from the different beam patterns of said antenna for said frame transmission, wherein said another beam pattern is a non-directional beam pattern, wherein said second determined preamble length is longer than said first determined preamble length, and perform said frame transmission using said selected beam pattern.

2. The communication device according to claim 1, wherein the circuitry is further configured to:

hold transmission/reception history associated with said frame transmission destination, wherein, at the time of said frame transmission, said circuitry selects one of the multiple types of preamble types with different preamble lengths based on the transmission/reception history associated with said frame transmission destination.

3. The communication device according to claim 2, wherein said circuitry holds a transmission/reception time information of a last transmission/reception with said frame transmission destination as said transmission/reception history, and wherein, at the time of frame transmission, the circuitry selects one of the multiple types of preamble types with different preamble lengths based on an elapsed time from a time associated with said last transmission/reception with said frame transmission destination.

4. The communication device according to claim 3, wherein said circuitry holds an elapsed time threshold for said frame transmission destination as said transmission/reception history, wherein, at the time of frame transmission, the circuitry references said transmission/reception history held thereby, wherein, in an event that the elapsed time from the time associated with last transmission/reception with said frame transmission destination is within said elapsed time threshold, said circuitry selects a preamble type or a last beam pattern used for said last transmission/reception, and wherein, in an event that the elapsed time from time associated with the last transmission/reception with said frame transmission destination exceeds said elapsed time threshold, said circuitry selects a preamble type having a preamble length longer than that used for frame transmission the last time, or invalidates the last beam pattern used for said last transmission/reception.

5. The communication device according to claim 4, wherein said circuitry increases a value of said elapsed time threshold in accordance with frame transmission/reception processing with success of said frame transmission destination, and reduces said value of said elapsed time threshold in accordance with said frame transmission/reception processing with failure of said frame transmission destination.

6. The communication device according to claim 1, wherein, in an event of application of said transmission/reception procedures in which a transmission request frame (RTS: Request To Send) is transmitted to said frame transmission destination, and upon reception of a confirmation notification frame (CTS: Clear To Send) from said frame transmission destination, transmission of data frames is started, said circuitry is configured to:

form said selected beam pattern directed to said frame transmission destination based on reception signals in an event of having received an RTS frame from said frame transmission destination; and form said selected beam pattern used in an event of transmission of data frames to said frame transmission destination based on said reception signals in the event of having received a CTS frame from said frame transmission destination.

7. The communication device according to claim 6, wherein, at the time of transmission of a data frame to said frame transmission destination using said selected beam pattern formed based on the CTS frame received from said frame transmission destination.

8. The communication device according to claim 6, wherein, in the event that a last beam pattern used at the time of a last data frame transmission is judged as valid, said circuitry consecutively transmits data frames using the last beam pattern, without transmission of the RTS frame.

9. The communication device according to claim 6, wherein, in the event that a last beam pattern used at the time of the last data frame transmission is judged as valid, said circuitry transmits said data frames with a rate of pilot symbols inserted in a payload portion reduced.

10. The communication device according to claim 1, wherein said circuitry stores previous transmission/reception time information associated with said frame transmission destination as transmission/reception history, and wherein said first preamble type is selected based on said transmission/reception history, when said transmission/reception history is determined to be valid.

11. The communication device according to claim 10, wherein said transmission/reception history is determined to be valid in a state that an elapsed time from previous transmission/reception with said frame transmission destination is greater than an elapsed time threshold, and wherein said elapsed time threshold is determined based on a value of a counter being updated corresponding to said transmission/reception procedures.

12. A communication method using an antenna configured to form different beam patterns, comprising:

controlling frame transmission/reception procedures;

controlling a beam pattern from the different beam patterns of the antenna after the frame transmission/reception procedures;

selecting, at a time of a frame transmission, a first preamble type having a first determined preamble length from a multiple types of preamble types when said circuitry controls said beam pattern to focus on a frame transmission destination for said frame transmission;

selecting said beam pattern focused on said frame transmission destination from the different beam patterns of said antenna for transmission/reception;

wherein a second preamble type from said multiple types of preamble types having a second determined longer preamble length is selected for said frame transmission when another beam pattern not controlled by said circuitry is selected from the different beam patterns of said antenna for said frame transmission, wherein said another beam pattern is a non-directional beam pattern, wherein said second determined preamble length is longer than said first determined preamble length; and performing said frame transmission using said selected beam pattern.

13. A non-transitory computer-readable medium encoded with computer-readable instructions thereon, the computer-readable instructions when executed by a computer to control communication operations using an antenna configured to form different beam patterns, cause the computer to perform a method comprising:

controlling frame transmission/reception procedures;

instructing control of a beam pattern from the different beam patterns following said frame transmission/reception procedures;

selecting, at a time of a frame transmission, a first preamble type having a first determined preamble length from a multiple types of preamble types when said circuitry controls said beam pattern to focus on a frame transmission destination for frame transmission;

selecting said beam pattern focused on said frame transmission destination from said different beam patterns of said antenna for transmission/reception; and wherein a second preamble type from said multiple types of preamble types having a second determined longer preamble length is selected for said frame transmission when another beam pattern not controlled by said circuitry is selected from the different beam patterns of said antenna for said frame transmission, wherein said another beam pattern is a non-directional beam pattern, wherein said second determined preamble length is longer than said first determined preamble length; and performing said frame transmission using said selected beam pattern.

14. A communication system, comprising:

a first communication device including an antenna configured to form different beam patterns, and circuitry configured to:

control frame transmission/reception procedures, control a beam pattern from said different beam patterns of said antenna following said frame transmission/reception procedures, select, at a time of a frame transmission, a first preamble type having a first determined preamble length from a multiple types of preamble types when said circuitry controls said beam pattern to focus on a frame transmission destination for said frame transmission, wherein a second preamble type from said multiple types of preamble types having a second determined longer preamble length is selected for said frame transmission when another beam pattern not controlled by said circuitry is selected from the different beam patterns of said antenna for said frame transmission, wherein said another beam pattern is a non-directional beam pattern, wherein said second determined preamble length is longer than said first determined preamble length;

select said beam pattern focused on said frame transmission destination from said different beam patterns of said antenna for transmission/reception, and perform said frame transmission using said selected beam pattern; and a second communication device to serve as said frame transmission destination.

* * * * *